(12) United States Patent
Kashiwa

(10) Patent No.: US 8,947,754 B2
(45) Date of Patent: Feb. 3, 2015

(54) IMAGE PROCESSING DEVICE DISPLAYING A PREVIEW IMAGE AND IMAGE PROCESSING METHOD AND PROGRAM DISPLAYING A PREVIEW IMAGE

(75) Inventor: Shuhei Kashiwa, Nishinomiya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 698 days.

(21) Appl. No.: 12/725,776

(22) Filed: Mar. 17, 2010

(65) Prior Publication Data

US 2010/0238517 A1 Sep. 23, 2010

(30) Foreign Application Priority Data

Mar. 19, 2009 (JP) ................................. 2009-067750

(51) Int. Cl.
  *G06K 15/00* (2006.01)
  *G03F 3/08* (2006.01)
  *H04N 1/46* (2006.01)
  (Continued)

(52) U.S. Cl.
  CPC ....... *H04N 1/00469* (2013.01); *H04N 1/00411* (2013.01); *H04N 1/0044* (2013.01); *H04N 1/00458* (2013.01); *G03G 15/502* (2013.01); *H04N 2201/0094* (2013.01)
  USPC .......... 358/527; 358/1.18; 358/538; 358/537; 348/333.12

(58) Field of Classification Search
  USPC .................... 358/1.18, 527, 538; 382/333.12; 715/274, 277; 345/619–622, 671
  See application file for complete search history.

(56) References Cited

U.S. PATENT DOCUMENTS

| 7,064,858 B2 | 6/2006 | Iwai et al. |
| 7,889,405 B2 * | 2/2011 | Takami et al. ................. 358/527 |

(Continued)

FOREIGN PATENT DOCUMENTS

| JP | 2006-060387 | 3/2006 |
| JP | 2006-166219 A | 6/2006 |

(Continued)

OTHER PUBLICATIONS

Office Action dated Nov. 30, 2010, issued in the corresponding Japanese Patent Application No. 2009-067750, and an English Translation thereof.

(Continued)

*Primary Examiner* — Barbara Reinier
(74) *Attorney, Agent, or Firm* — Buchanan Ingersoll & Rooney PC

(57) ABSTRACT

An image processing device includes an image reading part for reading an image of a document and generating image data, a preview image creation part for creating preview image from the image data generated by the image reading part, a display part capable of displaying at least one part of the preview image, an operation input part for receiving input in response to operation made by a user, a display area determination part for determining a part specified in response to operation made through the operation input part as a displaying area of the preview image, and a display control part for extracting an image responsive to the displaying area from the preview image and for displaying the extracted image on the display part. So, a load for user's operation for preview of an image read from a document may be reduced, and page update and others may be executed efficiently by reducing time to preview display.

15 Claims, 20 Drawing Sheets

(51) Int. Cl.
*H04N 5/222* (2006.01)
*H04N 1/00* (2006.01)
*G03G 15/00* (2006.01)

(56) References Cited

U.S. PATENT DOCUMENTS

| | | | |
|---|---|---|---|
| 8,014,013 B2 * | 9/2011 | Owen et al. | 358/1.15 |
| 2006/0038908 A1 | 2/2006 | Yoshino | |
| 2006/0062473 A1 * | 3/2006 | Moromizato et al. | 382/190 |
| 2007/0216973 A1 * | 9/2007 | Tagawa | 358/527 |
| 2007/0297010 A1 * | 12/2007 | Kotani et al. | 358/1.18 |
| 2009/0066730 A1 | 3/2009 | Mikawa | |

FOREIGN PATENT DOCUMENTS

| | | |
|---|---|---|
| JP | 2007-116546 A | 5/2007 |
| JP | 4054941 | 3/2008 |
| JP | 2009-063822 | 3/2009 |
| JP | 2009-302759 | 12/2009 |
| JP | 2010-093661 | 4/2010 |

OTHER PUBLICATIONS

Office Action dated Feb. 22, 2011, issued in the corresponding Japanese Patent Application No. 2009-067750, and an English Translation thereof.

* cited by examiner

IMAGE PROCESSING DEVICE DISPLAYING A PREVIEW IMAGE AND IMAGE PROCESSING METHOD AND PROGRAM DISPLAYING A PREVIEW IMAGE

This application is based on the application No. 2009-067750 filed in Japan, the contents of which are hereby incorporated by reference.

BACKGROUND OF THE INVENTION

1. Field of the Invention

The present invention relates to an image processing device and an image processing method.

2. Description of the Background Art

Some image processing devices capable of reading an image of a document make preview display of the image read from the document before outputting the read image to print sheets and the like. The resolution of display device which makes preview display of the image, however, is normally lower than the one of the image actually printed, so it is difficult for a user to check detail of the read image with the previewed image.

It is a publicly known technique to produce a sheet on which a particular image that is made preview display is printed, thereby allowing a user to check only the minimum of image by actually printing (as disclosed for example in Japanese Patent Application Laid-Open No. 2006-166219). According to this conventional technique, when the user is difficult to check the detail with the previewed image on the display device, he or she may produce a printed sheet to check with the actual image.

Furthermore, it is a publicly known technique to detect position of anomalous of image quality which is generated by reading of an image based on basis information acquired from data of the read image, and to display an area includes the position of anomalous of image quality of the read image on a display device (as disclosed for example in Japanese Patent Application Laid-Open No. 2007-116546). According to this conventional technique, if anomalous of image quality is generated during the reading of an image of a document, the part is made preview display. Therefore, a user may easily recognize the generation of anomalous of image quality, thereby making actions such as rereading of the document or the like if necessary.

However, according to a known technique disclosed in above-described Japanese Patent Application Laid-Open No. 2006-166219, printed sheet needs to be produced for the detail of an image to be checked. So, it requires a time for producing the printed sheet, and checking performance cannot be made efficiently. Also, a known technique disclosed in above-described Japanese Patent Application Laid-Open No. 2007-116546 is relating to a technique of making preview display in case of generation of anomalous of image quality during the reading of a document. Thus, when a document itself causes a problem such as, is a document with pages in not a precise order or the like, it is difficult to make preview display that allows a user to check efficiently whether the document causes any problem. Moreover, according to a known technique disclosed in Japanese Patent Application Laid-Open No. 2007-116546, processing for detecting position of anomalous of image quality based on basis information needs to be executed every time, so time required to preview display is taken longer.

By way of example, if a document itself causes a problem such as, the document including some pages set in different direction from others or the document with pages in not a precise order, it is still difficult for a user to check even with a whole image of the read document being previewed on a low-resolution display device. In order to check whether a document is read with being in appropriate direction, with pages in not a precise order, and others, the user needs to make operation to enlarge a part in which page number is stated, for instance, of a preview image of the read document. When, however, operation for enlarging image is made for each page, resulting in cumbersome operations for a user, and efficient checking performance cannot be realized.

On the other hand, for making preview display of the image of the read document, it is assumed that the part in which page number of the document or the like is stated can be automatically recognized, and the part thereby recognized can be enlarged automatically. In this case, however, very long processing time is required for automatic recognition for each page, and the part in which page number or the like is stated takes a long time to be enlarged. As a result, even in this case, efficient checking performance cannot be realized.

SUMMARY OF THE INVENTION

First, the present invention is directed to an image processing device.

The image processing device according to one aspect of the present invention comprises: an image reading part for reading an image of a document and generating image data; a preview image creation part for creating preview image from the image data generated by the image reading part; an image display part capable of displaying at least one part of the preview image; an operation input part for receiving inputs made by a user; a displaying area determination part for determining a part specified in response to operation made through the operation input part as a displaying area of the preview image; and a display control part for extracting an image responsive to the displaying area from the preview image, and for displaying the extracted image on the image display part.

Second, the present invention is directed to an image processing method.

The image processing method according to an aspect of the present invention comprises steps of: (a) reading an image of a document, and generating image data; (b) creating preview image from the image data; (c) determining a displaying area of the preview image based on user's operation to specify; (d) extracting an image responsive to the displaying area from the preview image; and (e) displaying the image extracted in response to the displaying area.

The present invention is intended to solve the problems described above. Thus, the present invention is intended to provide an image processing device and an image processing method capable of limiting range that is made preview display to a part that the user would like to check for making preview display of an image read from a document, thereby reducing load for user's operation and time to preview display.

DESCRIPTION OF THE PREFERRED EMBODIMENTS

Figure 1:
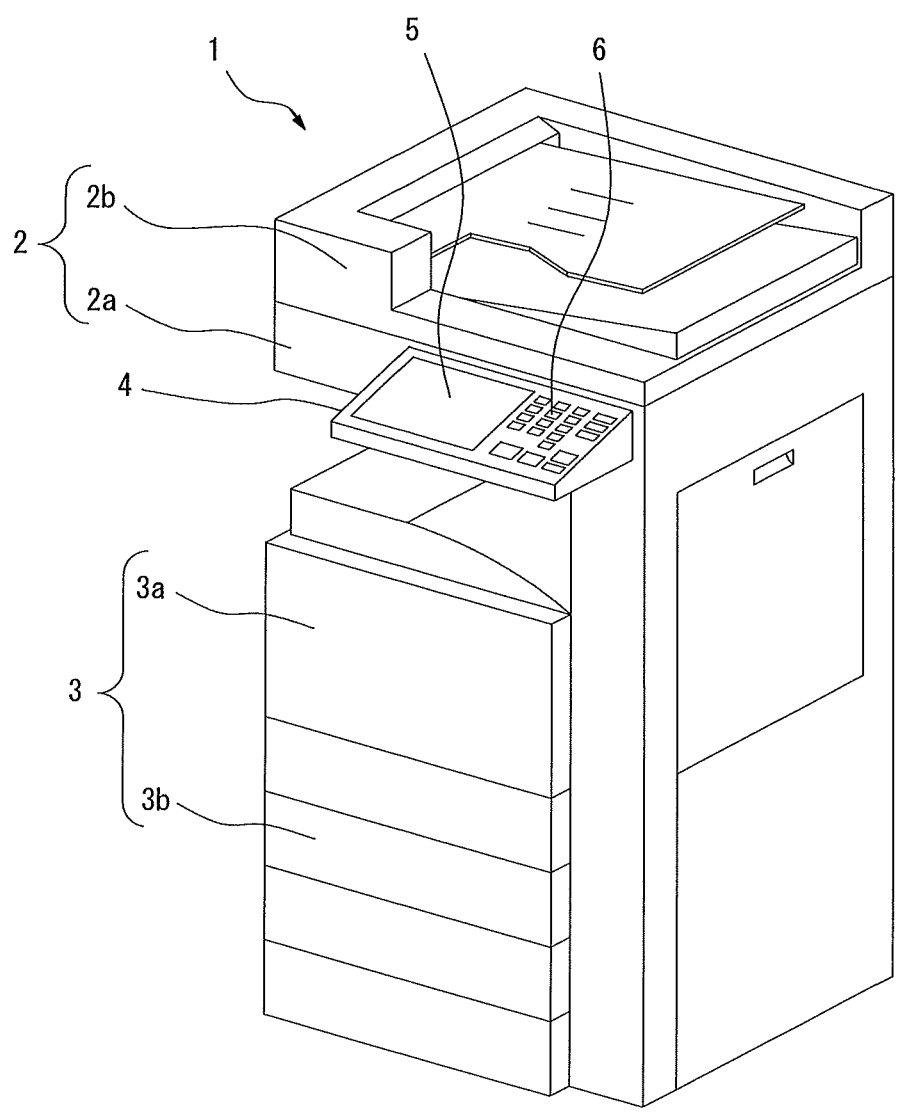
FIG. 1 shows an exemplary configuration of an image processing device of the present invention.

Preferred embodiments of the present invention are described in detail below with reference to figures. In the description given below, those elements which are shared in common among the preferred embodiments are represented by the same reference numerals, and are not discussed repeatedly for the same description.

First Preferred Embodiment

FIG. 1 shows an exemplary configuration of an image processing device 1 according to the first preferred embodiment. The image processing device 1 is a device what is generally called a complex device or MFPs (multifunction peripherals). This image processing device 1 includes an image reading section 2 provided at the upper part of a device body, and an image formation section 3 provided at the lower part of the device body. The image processing device 1 is provided with an operational panel 4 for displaying various types of information to a user arranged on the front side of the image reading section 2, and through which the user makes input.

The image reading section 2 includes a scanner unit 2a for reading images of documents optically and generating image data, and an automatic document feeder (ADF) 2b capable of holding a document with a plurality of pages placed thereon, and from which each page of the document with the plurality of pages placed thereon is automatically fed one by one to the scanner unit 2a. The image reading section 2 causes the scanner unit 2a and the ADF 2b to operate in synchronization with each other, by which the scanner unit 2a can execute sequential automatic reading of a document with a plurality of pages being fed one by one by the ADF 2b.

The image formation section 3 includes a printer unit 3a for forming an image by transferring a toner image to a printing medium such as an output sheet, and a sheet feed unit 3b for supplying output sheets one by one to the printer unit 3a. The image formation section 3 causes the sheet feed unit 3b and the printer unit 3a to operate in synchronization with each other, by which a printed sheet is produced.

The operational panel 4 includes a display unit 5 for displaying various types of information to a user, and an operation unit 6 through which the user makes inputs to the image processing device 1. The display unit 5 is formed, for example, from a liquid crystal display that can display color images. An image read by the image reading section 2 from a document, for example, is made preview display on the display screen of the display unit 5. The operation unit 6 is formed by a plurality of operation keys including touch panel keys arranged on a surface of the display unit 5, and a plurality of push-button keys arranged around the display unit 5. The plurality of push-button keys include a start key for a user to give instructions for execution of the sequential automatic reading of a document with a plurality of pages being fed one by one by the ADF 2b. When previewing an image of a document read by image reading section 2, a user can specify a particular part of a whole image of the document as a displaying area by making operation of the touch panel keys, for instance.

The configuration and operation in the image processing device 1 of the first preferred embodiment when an image of a document is read by the image reading section 2, and the image thereby read is made preview display on the display unit 5 of the operational panel 4 are described in detail below.

Figure 2:
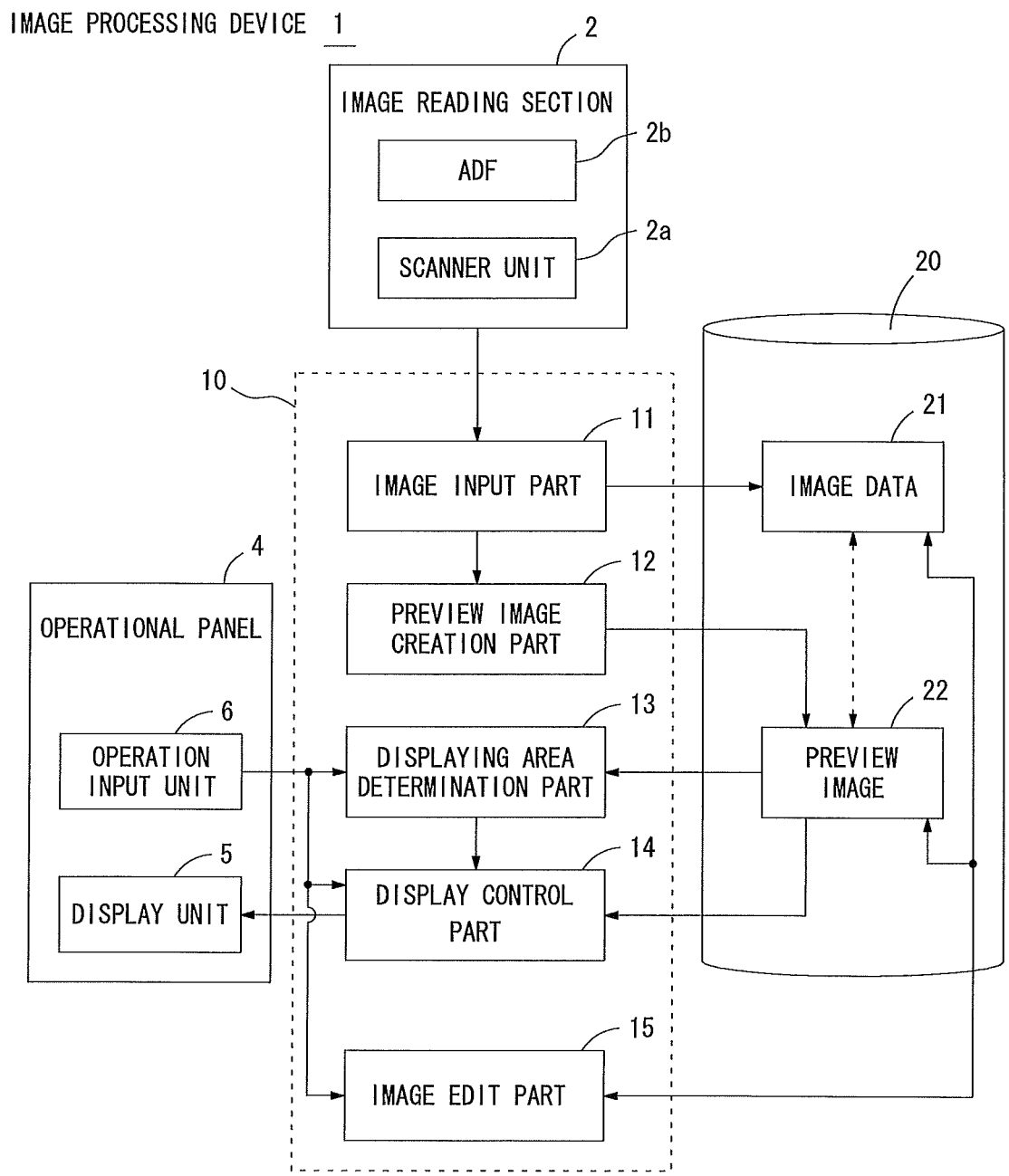
FIG. 2 is a block diagram showing an exemplary functional configuration realized by the image processing device.

FIG. 2 is a block diagram showing an exemplary functional configuration realized by the image processing device 1. The functional configuration shown here is for a case when an image of a document is read by the image reading section 2, and the image thereby read is made preview display on the display unit 5 of the operational panel 4. In addition to the image reading section 2 and the operational panel 4, a control computer 10 and a storage device 20 are included in the image processing device 1.

The control computer 10 includes a CPU, memory and others, for example. The CPU executes processing based on a predetermined program to function as various types of processing parts, thereby controlling operations of each hardware sections of the image processing device 1. More in detail, when an image of a document is read by the image reading section 2, and the image thereby read is made preview display on the display unit 5 of the operational panel 4 in the image processing device 1, the control computer 10 functions as an image input part 11, an preview image creation part 12, a displaying area determination part 13, a display control part 14, and an image edit part 15 as shown in FIG. 2.

The storage device 20 is a nonvolatile storage device such as a hard disk device, a semiconductor memory, and the like. The storage device 20 stores therein each page of an image data 21 one by one generated by the image reading section 2 with reading a document. The storage device 20 also stores therein a preview image 22 to be displayed on the display unit 5 of the operational panel 4.

The image input part 11 of the control computer 10 inputs the image data 21 generated by the image reading section 2 with reading a document. As inputting the image data 21 from the image reading section 2, the image input part 11 stores the image data 21 into the storage device 20. The image input part 11 also outputs the image data 21 input from the image reading section 2 to the preview image creation part 12.

The preview image creation part 12 creates the preview image 22 to be displayed on the display unit 5. The preview image creation part 12, based on the image data 21 of each page generated by the image reading section 2, creates the preview image 22 in data format that allows display on the display unit 5, and stores the created preview image 22 into the storage device 20. The preview image 22 created here is an image of a whole page image, and resolution of which is almost the same as one of the image data 21 generated by the image reading section 2, for example. So, the preview image 22 is a highly-resolved sophisticated image compared with the screen resolution of the display unit 5.

The displaying area determination part 13 determines a part of the preview image 22 created by the preview image creation part 12 as a displaying area R to be displayed on the display unit 5. The displaying area determination part 13 determines a part which is specified from a whole image of the preview image 22 by a user through the operation input unit 6 of the operational panel 4 as the displaying area R. As determining the displaying area R of the preview image 22, the displaying area determination part 13 notifies the displaying area R to the display control part 14.

The display control part 14 reads the preview image 22 stored in the storage device 20, and outputs an image based on the preview image 22 to the display unit 5, thereby making preview display of the image of the document read by the image reading section 2. Here, when instructions as to the displaying area R is given from the displaying area determination part 13, the display control part 14 extracts an image responsive to the displaying area R from a whole image of the preview image 22, and displays on the display unit 5. The display control part 14 executes enlarging processing for the image responsive to the displaying area R if necessary. The image of the part specified by the user is displayed as large as possible on the display unit 5, so that the user is easier to check.

Compared with display size of the display unit 5, it is assumed full size of the preview image 22 is the same or larger. In this case, the image responsive to the displaying area R is displayed in full-size or in reduced-size. Even in such case, the image responsive to the displaying area R is displayed as large as possible on the display unit 5, so a user is allowed to check easily.

When inputting a user's page forwarding operation through the operation input unit 6 with the preview image 22 being displayed on the display unit 5, the display control part 14 reads another preview image 22 from the storage device 20 based on the operation, and updates preview display on the display unit 5 to the one of an image of another page. The display control part 14 may also automatically update preview display displayed on the display unit 5 to one of the stored preview image 22 simultaneously with the preview image 22 of a following page to be stored in the storage device 20. Also at page update of preview display, the display control part 14 extracts an image responsive to the displaying area R from the preview image 22 to be displayed next, and displays the preview image 22 thereby extracted on the display unit 5. When an image read by the image reading section 2 is made preview display on the display unit 5, a user specifies the displaying area R at least once by making operation through the operation input unit 6. After that, an image of the part responsive to the displaying area R of the preview image 22 of each page is automatically displayed on the display unit 5. At this time, the image responsive to the displaying area R is displayed as large as possible on the display unit 5.

When inputting edit instructions given by a user through the operation input unit 6 with the image read by the image reading section 2 being made preview display on the display unit 5, the image edit part 15 executes edit processing of the image data 21 responsive to the preview image 22 currently being displayed. This edit processing, for example, includes processing for rotating the image data 21 corresponding to a page in order to make all pages in the same direction when the page is inserted in direction different from that of other pages, for deleting the image data 21 corresponding to a page when the page is unnecessary, for replacing a page to the appropriate position according to the order of the pages when the page is inserted in a wrong position according to the order of pages, and for superimposing character data (or image data) such as appropriate page number and adding the superimposed data to the image data 21 of a page when the page is missing page number. Therefore, these processing allow a user to check the preview image 22 displayed on the display unit 5, and to determine whether or not editing is necessary to be performed. When determining editing is necessary to be performed, the user may correct the image data 21 to make it appropriate. So, the document is not necessary to be read again, resulting in improving operability of the user. Image editing executed by the image edit part 15, however, is not limited to the edit processing described above, so various types of image editing may be executed in addition to above-described edit processing.

According to the above-described configuration, in the image processing device 1 of the first preferred embodiment, a document may be read by the image reading section 2, and the read image may be made preview display on the display unit 5 at the same time. A part of a whole image of the document to be displayed for preview is specified by a user at least once, and the specified part is determined as a displaying area R. Thus, the part thereby specified is made preview display for subsequent preview. That is, even when a preview page is updated to another page, the preview image 22 may be checked with the part thereby specified being displayed without any user's specific operation.

There are more than one examples of specifying which part of a whole image of the document to be displayed by a user. In the first preferred embodiment, an example of specifying an area which is made preview display in advance by a user before the start of the reading operation executed by the image reading section 2 is explained.

Figure 3:
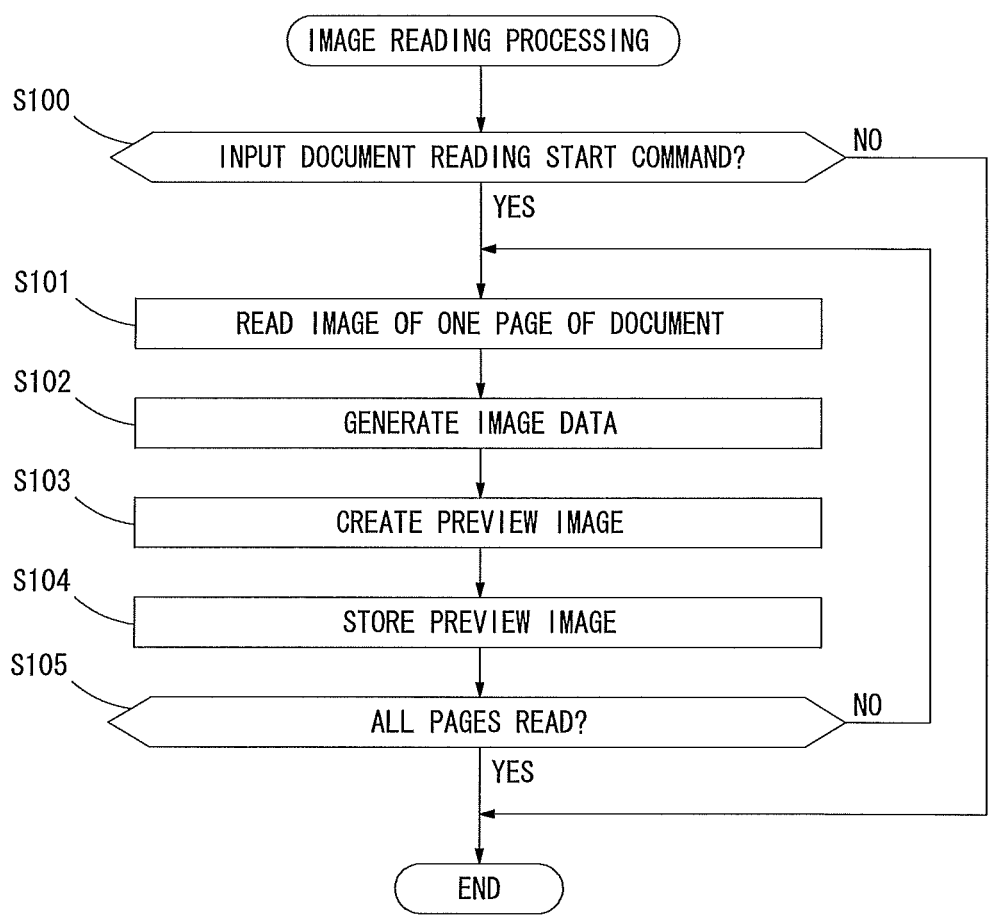
FIG. 3 is a flow diagram for explaining main routine of processing of reading of a document by an image reading section realized by control of a control computer in the image processing device.

FIG. 3 is a flow diagram for explaining main routine of processing of reading of a document by the image reading section 2 realized by the control of the control computer 10 in the image processing device 1. This processing is executed mainly by the image reading section 2, the image input part 11, and the preview image creation part 12. In addition, this processing is repeatedly executed in the image processing device 1 for example, at a constant frequency. As shown in FIG. 3, when this processing starts, whether or not the image reading section 2 input a document reading start command from the control computer 10 is determined (step S100). When for example, a start key included in the operation input unit 6 of the operational panel 4 is operated in response to user's operation, predetermined processing based on the operation is executed in the control computer 10. After the execution of the processing, the document reading start command is input to the image reading section 2 from the control computer 10. If the image reading section 2 isn't input the document reading start command (when a result of step S100 is NO), the processing completes. If the image reading section 2 is input the document reading start command, the processing moves on to step S101 and after.

The image reading section 2 causes the ADF 2b and the scanner unit 2a to operate, by which the scanner unit 2a reads an image of one page of a document being fed one by one by the ADF 2b (step S101). As completing reading of the image of one page of the document, the scanner unit 2a generates the image data 21 of the read image (step S102). This image data 21 is output to the image input part 11, and stored into the storage device 20. The image input part 11 outputs image data 21 to the preview image creation part 12. In the control computer 10, the preview image creation part 12 comes into operation to function to create the preview image 22 of one page based on the image data 21 generated by the scanner unit 2a (step S103). The preview image 22 thereby created is also stored into the storage device 20 (step S104).

The image reading section 2 determines whether or not reading of all pages is completed (step S105). If any page yet to be read is left (when a result of step S105 is NO), the process returns to step S101. The image reading section 2 reads image of the document, and repeats generation and storage of the image data 21, and creation and storage of the preview image 22. If the reading of all pages is completed (when a result of step S105 is YES), this processing completes.

Figure 4:
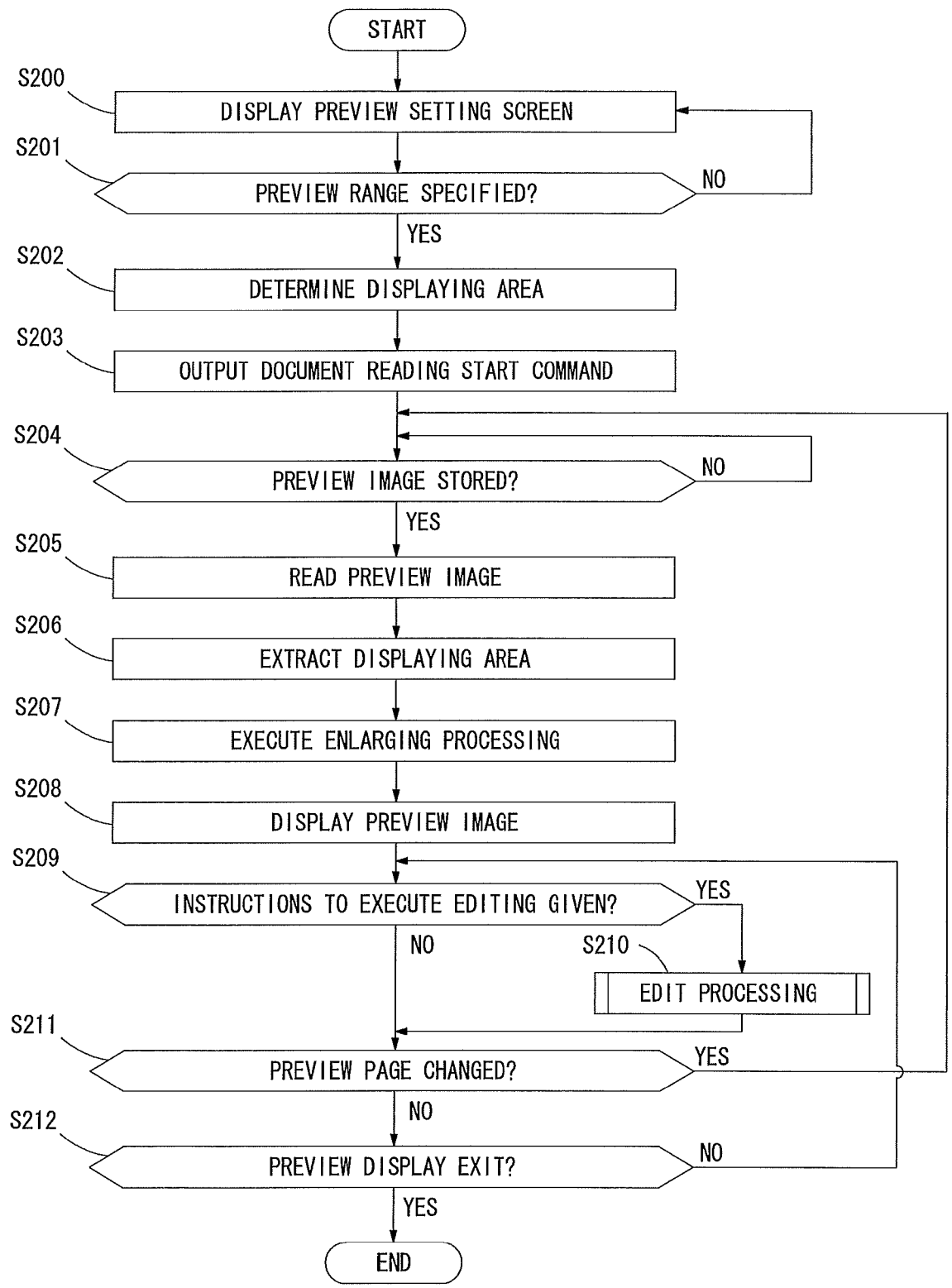
FIG. 4 is a flow diagram for explaining an exemplary procedure of a processing when making preview display on a display unit in parallel with execution of reading of a document by the image reading section in the image processing device.

FIG. 4 is a flow diagram explaining an exemplary procedure of a processing when making preview display on the display unit 5 in parallel with execution of reading of a document by the image reading section 2 in the image processing device 1. By mainly putting the displaying area determination part 13, the display control part 14, and the image edit part 15 into operation to function, the processing is executed in the control computer 10. The processing, for example, starts with the start key of the operational panel 4 being operated in response to user's operation. In addition, this processing may be executed in parallel with image reading processing illustrated in FIG. 3 in the image processing device 1.

Figure 5:
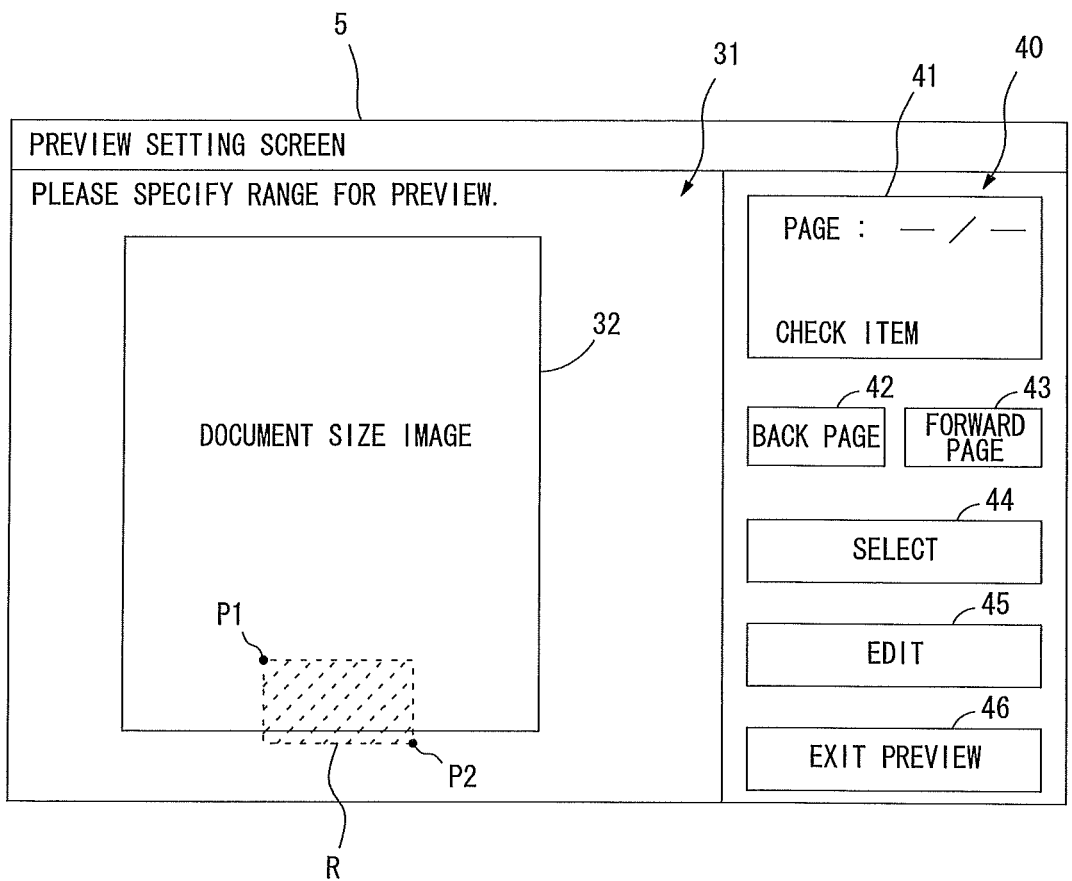
FIG. 5 is an example of a preview setting screen displayed on the display unit in the first preferred embodiment.

When detecting the start key was operated in response to user's operation, the control computer 10 displays a preview setting screen on the display unit 5 of the operational panel 4 (step S200). FIG. 5 is an example of the preview setting screen displayed on the display unit 5. As illustrated in FIG. 5, the preview setting screen includes a preview range specifying field 31 displayed at leftmost to the central part of the screen for a user to specify preview range, and an operation screen 40 displayed in the right side of the screen. The operation screen 40 is, however, a screen for allowing a user to operate a preview image after preview display is started. So, at this point of time, the screen cannot be operated particularly according to user's operation.

A document size image 32 of one page of a document is displayed in the preview range specifying field 31 as a sample based on document size specified by a user in advance, or document size automatically detected by the ADF 2b. Preview range that is desired by the user to be displayed with extra attention for preview is specified to the document size image 32. By way of example, as illustrated in FIG. 5, arbitrary two points that are P1 and P2 are specified to the document size image 32, and the preview range that has the specified P1 and P2 as diagonally opposite two vertices is specified. In the example of FIG. 5, shaded rectangle area is the preview range specified by the user.

The control computer 10 determines whether or not operation to specify the preview range is made by the user with the preview setting screen being displayed on the display unit 5 (step S201). When the preview range is specified (when a result of step S201 is YES), the displaying area determination part 13 determines a displaying area R based on the preview range thereby specified. So, in case of FIG. 5, the rectangle area of the preview range specified by the user is determined as it is as the displaying area R for preview display.

As the displaying area R is determined by the displaying area determination part 13, the control computer 10 outputs the document reading start command to the image reading section 2 (step S203). This makes a result of determination in step S100 in the flow diagram illustrated in FIG. 3 as described above, YES, so sequential reading of rest of pages of the document is executed until the execution of reading of images of all pages of the document fed one by one by the ADF 2b completes. Every time the reading of one page of the document is executed, the image data 21 and the preview image 22 are stored into the storage device 20 sequentially. From here, this processing based on the flow diagram shown in FIG. 4 is executed in parallel with the processing based on the flow diagram shown in FIG. 3.

As outputting the document reading start command, the control computer 10 puts the display control part 14 into operation to function to determine whether or not the preview image 22 for preview display is stored in the storage device 20 (step S204). When the preview image 22 to be displayed is not stored in the storage device 20, the display control part 14 is in a waiting state until the preview image 22 is stored. In response to the storage of the preview image 22, the display control part 14 reads the stored preview image 22 (step S205), and extracts an image responsive to the displaying area R (step S206). The display control part 14 executes the enlarging processing of the extracted image if necessary (step S207). By way of example, when an image of a part of the preview image 22 responsive to the displaying area R can be displayed on the display unit 5 even in larger than full size, the enlarging processing is executed for displaying the image of the displaying area R as large as possible. As explained above, however, if original size of the preview image 22 is large, reducing processing is sometimes necessary for displaying the part of the image responsive to the displaying area R. In such cases, the reducing processing of image is executed here. The display control part 14 outputs the extracted preview image 22 responsive to the displaying area R to the display unit 5, thereby making preview display of the image (step S208).

Figure 6:
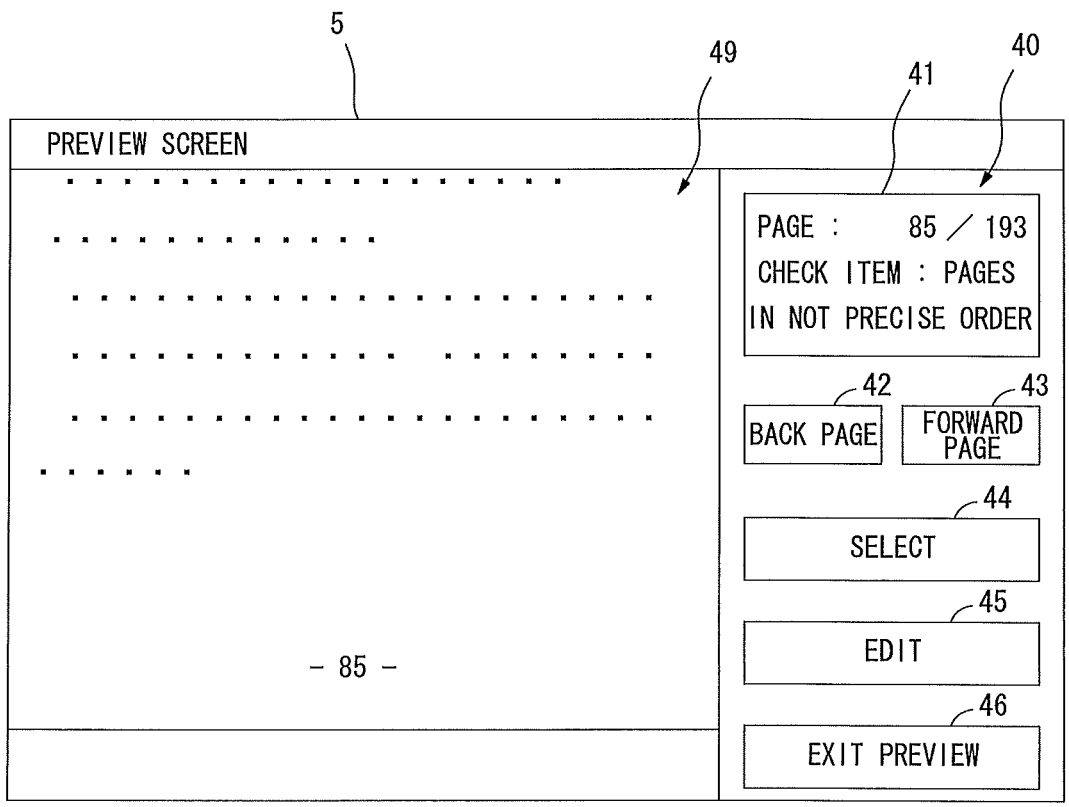
FIG. 6 is an example of a preview screen displayed on the display unit in the first preferred embodiment.

FIG. 6 is an example of a preview screen displayed on the display unit 5. As illustrated in FIG. 6, the preview screen includes the operation screen 40 displayed in the right side, and a preview field 49 displayed at leftmost to the central part of the screen. In the preview field 49, as shown in FIG. 6, the image of the part of the preview image 22 of one page responsive to the displaying area R specified by the user is displayed. In the example of FIG. 6, a part in which page number is stated is displayed in order for the user to check if the document is the one with pages in not a precise order, and the like. So, the user may check the page number easily by viewing the preview field 49.

Furthermore, in the operation screen 40, a preview information display field 41 for displaying detailed information relating to a page currently being made preview display. In addition to the preview information display field 41, a back page key 42 for changing a preview page to the previous page, a forward page key 43 for changing a preview page to the following page, a select key 44 for selecting a page currently being previewed, an edit key 45 for making edit operation of a page currently being previewed, and a exit key 46 for exiting preview are displayed on the operation screen 40 as operation keys operable for a user. The user makes operation of the back page key 42 or the forward page key 43, so that an image of a desired page may be made preview display. When the edit processing of the image data 21 responsive to the preview image 22 currently being made preview display is to be performed, the edit key 45 is operated by user's operation, so display screen changes to a screen for edit operation. Also, if batch edit processing is to be executed to the image data 21 of a plurality of pages, the select key 44 is operated by user's operation while an image of each page to be executed the batch edit processing is made preview display, so the images of each page are selected. Then, the edit key 45 is operated by user's operation after all pages are selected, and the display screen changes to a screen for edit operation. In addition, when exiting preview display, the exit key 46 is operated by user's operation to exit the preview.

The control computer 10 determines whether or not the edit key 45 is operated by user's operation with the above-described preview screen being displayed (step S209). When the edit key 45 is operated, the edit processing (step S210) is executed. The edit processing is explained in detailed in below. If the edit key 45 is not operated, the control computer 10 determines whether or not to change the page being made preview display (step S211). Here, if, for example, the back page key 42 or the forward page key 43 is operated by user's operation, the control computer 10 determines to update the preview page. After the elapse of predetermined time since starting preview of the page currently being made preview display, the preview page may be updated to the following page automatically. Moreover, as the preview image 22 of next page following the current page is stored into the storage device 20, the preview page may be updated to the following page automatically.

When the preview page is to be updated (when a result of step S211 is YES), the process returns to step S204 to repeat the above-described processing. When the preview page is not to be updated (when a result of step S211 is NO), the control computer 10 determines whether or not to exit preview display (step S212). Here, whether or not the exit key 46 is operated by user's operation. If the complete key 46 is operated, this processing completes, and if the exit key 46 is not operated, the process returns to step S209 to repeat the above-described processing.

By execution of the above-described processing, even if, for example, the preview page is updated, the preview image 22 is read from the storage device 20, an image responsive to the displaying area R is extracted from the preview image 22, and appropriate processing such as the enlarging processing is executed. On the display unit 5, the image of the part responsive to the displaying area R specified by a user is displayed. As a result, the image of the part that the user would like to check may be displayed on the display unit 5 without any particular operations made by the user at page update.

Figure 7:
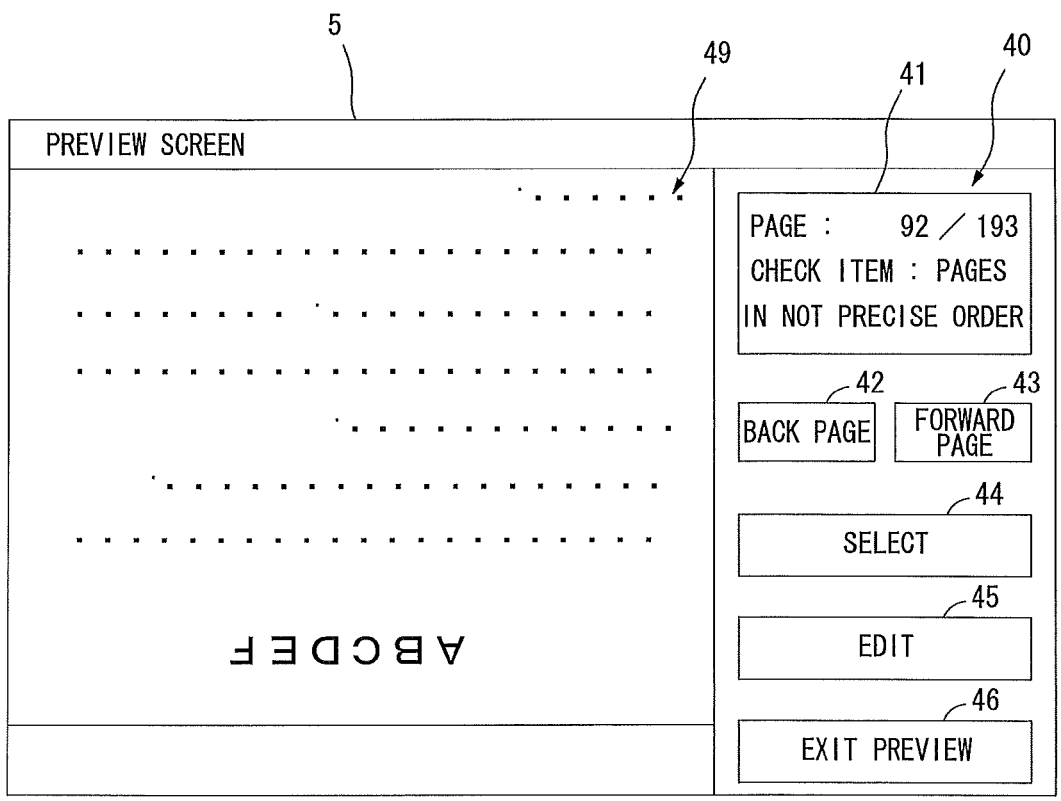
FIG. 7 is an example of preview screen different from that of FIG. 6.
Figure 8:
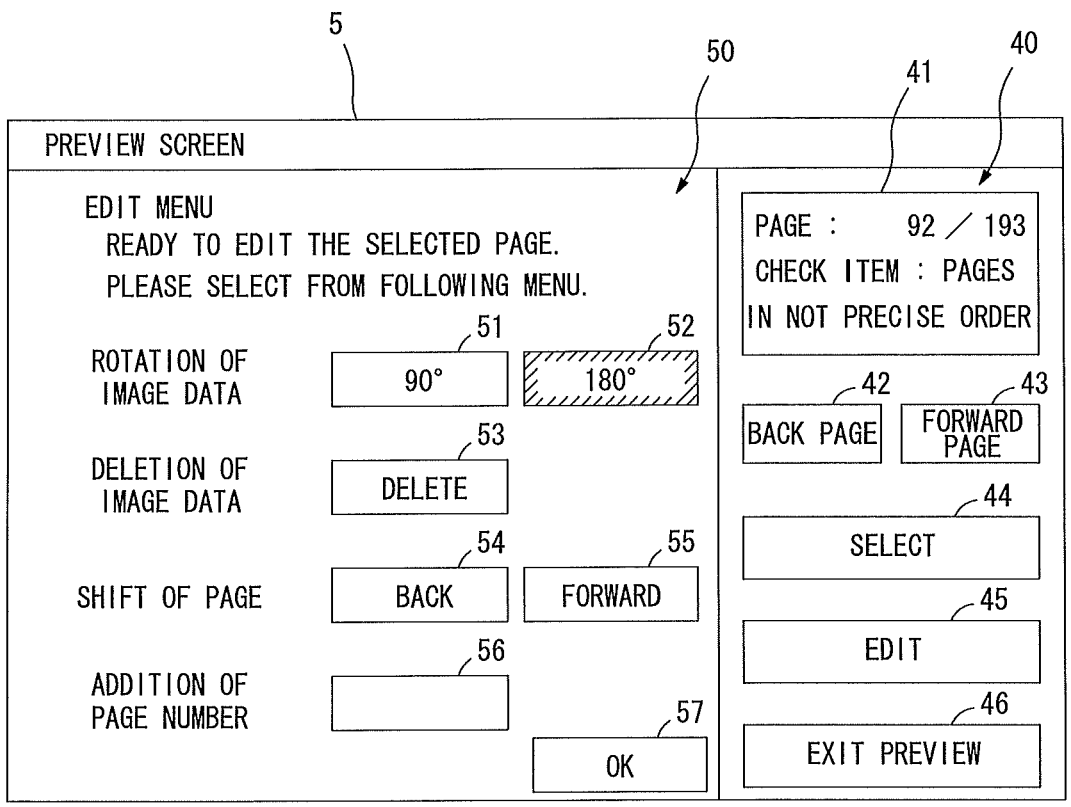
FIG. 8 is an example of an edit menu screen displayed on the display unit.

Next a procedure of the edit processing is explained. FIG. 7 is an example of preview screen different from that of FIG. 6. As illustrated in FIG. 7, when the image of the part responsive to the displaying area R displayed in the preview field 49 is vertically inverted, the user makes operation to operate the edit key 45 to perform editing of the image data 21. The display screen then changes to an edit menu screen illustrated in FIG. 8 from the preview screen of FIG. 7. The edit menu screen includes the operation screen 40 displayed in the right side, and an edit menu field 50 displayed at leftmost to the central part of the screen. In the edit menu field 50, edit menu selectable for the user is displayed. In the example of FIG. 8, rotation image data, deletion image data, shift of page, and addition of page number are displayed as selectable items. In the right side of these items, operation keys 51 to 57 operable for the user are displayed. An ok key 57 is operated after one of the operation keys 51 to 57 is operated by user's operation, and edit processing thereby selected is executed. By way of example, when a page made preview display is vertically inverted as shown in FIG. 7, the ok key 57 is operated with the operation key 52 for rotating the image data 21 180-degrees being selected by user's operation as shown in FIG. 8. The control computer 10 puts the image edit part 15 into operation to function to execute image edit processing specified by the user.

Figure 9:
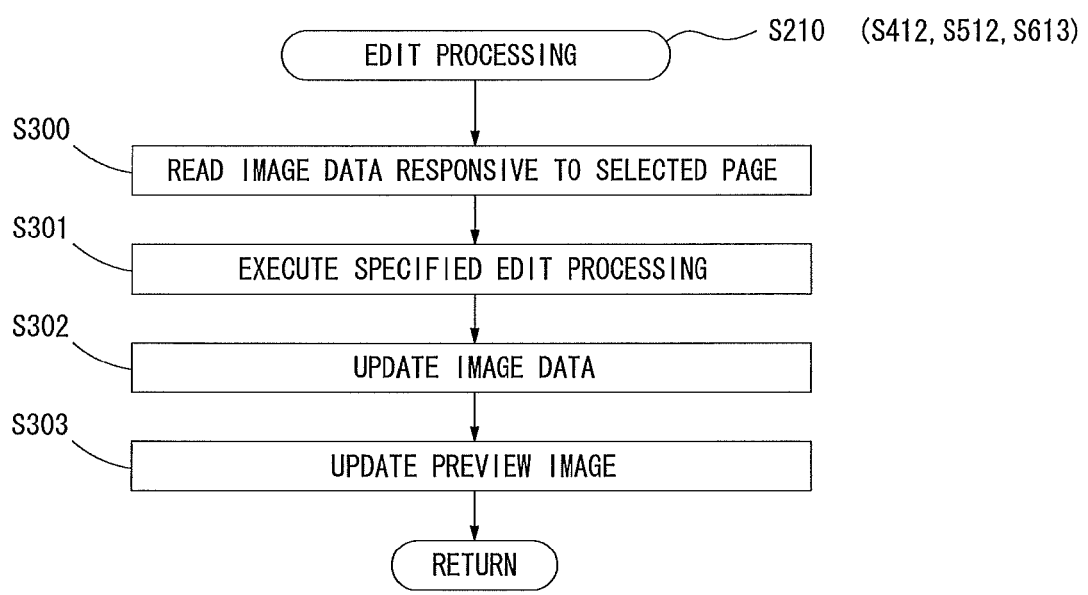
FIG. 9 is a flow diagram explaining an exemplary procedure of edit processing in detail.

FIG. 9 is a flow diagram explaining an exemplary procedure of the edit processing (step S210) in detail. The image edit part 15 reads the image data 21 responsive to a page selected by the user (step S300). When, for example, a plurality of pages are selected by the user, the image edit part 15 reads the image data 21 respectively responsive to each of the pages. The image edit part 15 then executes edit processing specified by the user on the above-described edit menu screen (step S301). As an example, if processing for rotating the image data 21 180-degrees is specified, the image edit part 15 rotates the read image data 21 180-degrees. Accompany the rotation of the image data 21, the preview image 22 stored in the storage device 20 is rotated. So, the image edit part 15 executes the same edit processing to the image data 21 and to the preview image 22. As the preview image 22 after the execution of the edit processing is written over the preview image 22 stored in the storage device 20, the preview image 22 is updated (step S303). After that, when the same page is to be made preview display, the preview image 22 executed the edit processing is displayed, so a result of the edit processing may be checked easily by the user.

As explained above, for the image processing device 1 of the first preferred embodiment, the operation input unit 6 is operated by user's operation to specify an image part that the user would like to check by preview in advance when the sequential reading of a document is executed. When, for instance, the user would like to check if a document is the one with pages in not a precise order, he or she specifies a part in which page number and the like is stated as the image part to be checked with preview by seeing the document set on the ADF 2b. Thus, the displaying area R for preview display is determined before the start of reading of the document. In response to the start of sequential reading of the document by the image reading section 2, the display control part 14 extracts an image responsive to the predetermined displaying area R from the preview image 22 of one page, and displays the extracted image, so the image of the part that is desired by the user may be displayed on the display unit 5 selectively. At this time, the display control part 14 is not required to automatically recognize whether or not the part includes a part in which page number and the like is stated, resulting in reduced time taken before preview display. For page update, the display control part 14 extracts the displaying area R from the preview image 22, and displays the extracted image on the display unit 5. After that, user's operation to specify the part for preview for each page is not necessary, so the load for user's operation can be reduced.

According to the first preferred embodiment, a part specified by a user is determined as the displaying area R of the preview image 22, and for preview display based on the preview image 22, an image responsive to the displaying area R is extracted from the preview image 22, and the image thereby extracted is displayed. Therefore, for making preview display of the image read from the document, range made preview display can be limited to the part that the user would like to check. As a result, even in case of updating the preview page and the like, user's particular operation is not necessary for each time, so the load for user's operation can be reduced. Also, for displaying the preview image 22, an image responsive to the displaying area R predetermined by the user should always be extracted, and be displayed, resulting in reduced time taken before preview display. Therefore, processing such as update of the preview page may be executed efficiently.

Second Preferred Embodiment

A second preferred embodiment of the present invention is described next. In the second preferred embodiment, for user's operation to specify which part of a whole image of a document to be displayed, while an item that a user desires to check is selected, the image processing device 1 displays recommended preview range based on the selected item. The configuration of the image processing device 1 of the second preferred embodiment is the same as that of the first preferred embodiment illustrated in FIG. 1 and FIG. 2. The process sequence of reading of an image of a page of a document by the image reading section 2 of the second preferred embodiment is the same as that of the first preferred embodiment illustrated in FIG. 3.

Figure 10:
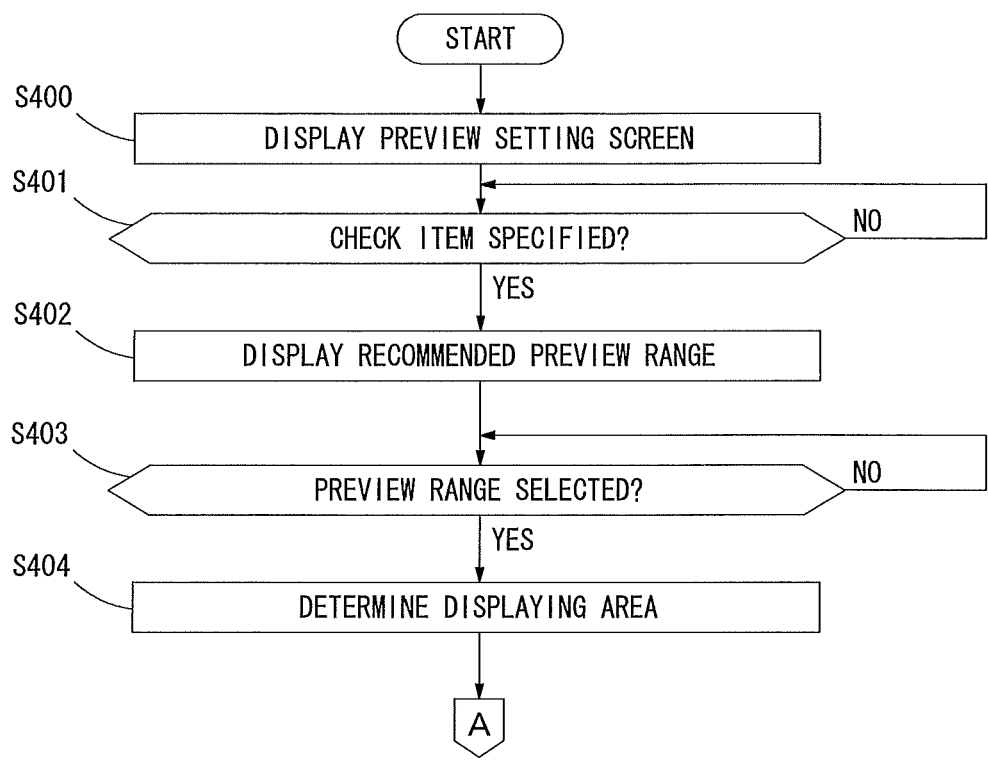
FIG. 10 and FIG. 11 are flow diagrams explaining an exemplary procedure of a processing when making preview display on the display unit in parallel with execution of reading of a document by the image reading section in the image processing device of the second preferred embodiment.
Figure 11:
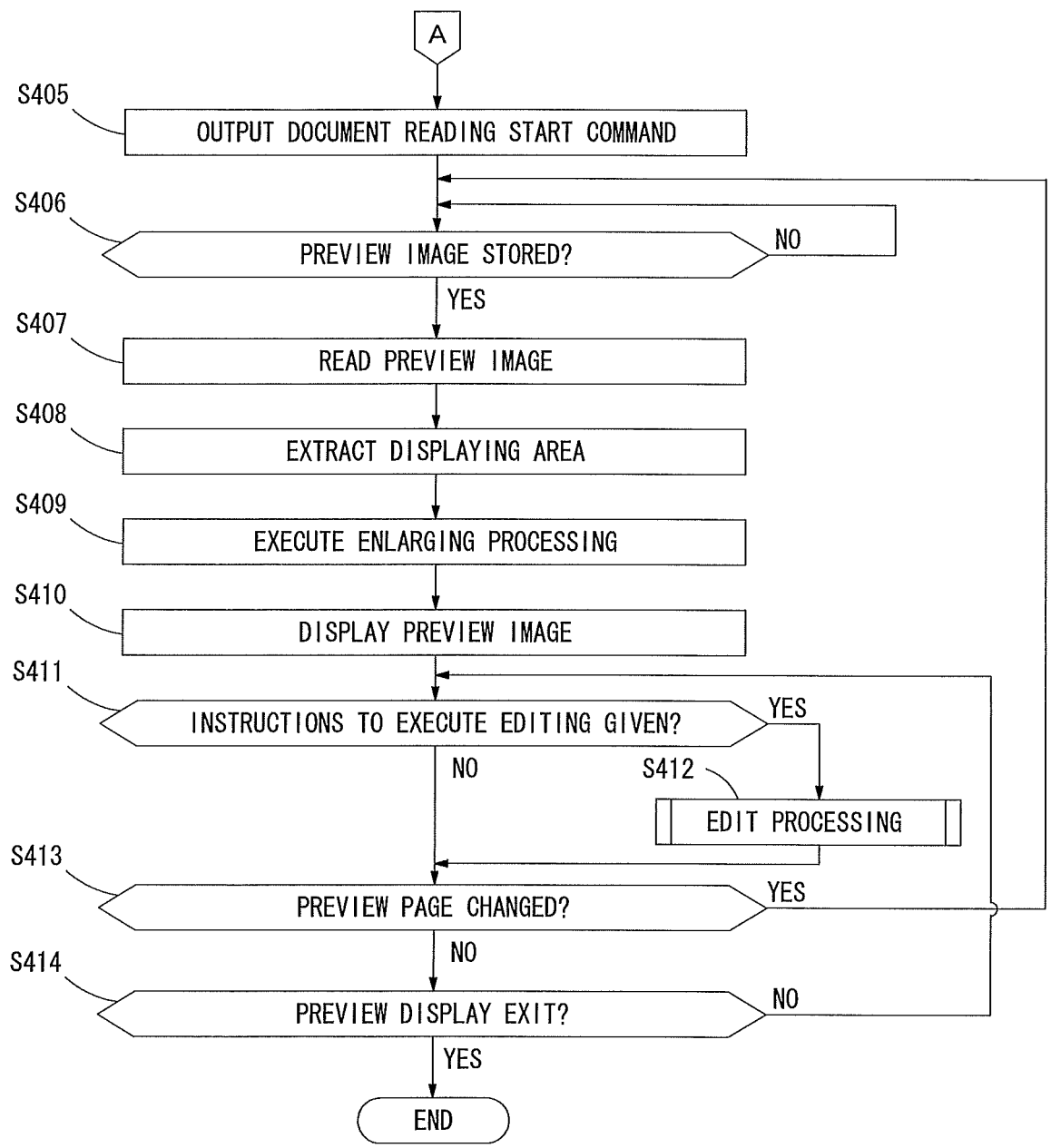

FIG. 10 and FIG. 11 are flow diagrams explaining an exemplary procedure of a processing when making preview display on the display unit 5 in parallel with execution of reading of a document by the image reading section 2 in the image processing device 1 of the second preferred embodiment. By mainly putting the displaying area determination part 13, the display control part 14, and the image edit part 15 into operation to function, the processing is executed in the control computer 10. The processing, for example, starts with the start key of the operational panel 4 being operated in response to user's operation. In addition, this processing may be executed in parallel with the image reading processing illustrated in FIG. 3 in the image processing device 1.

Figure 12:
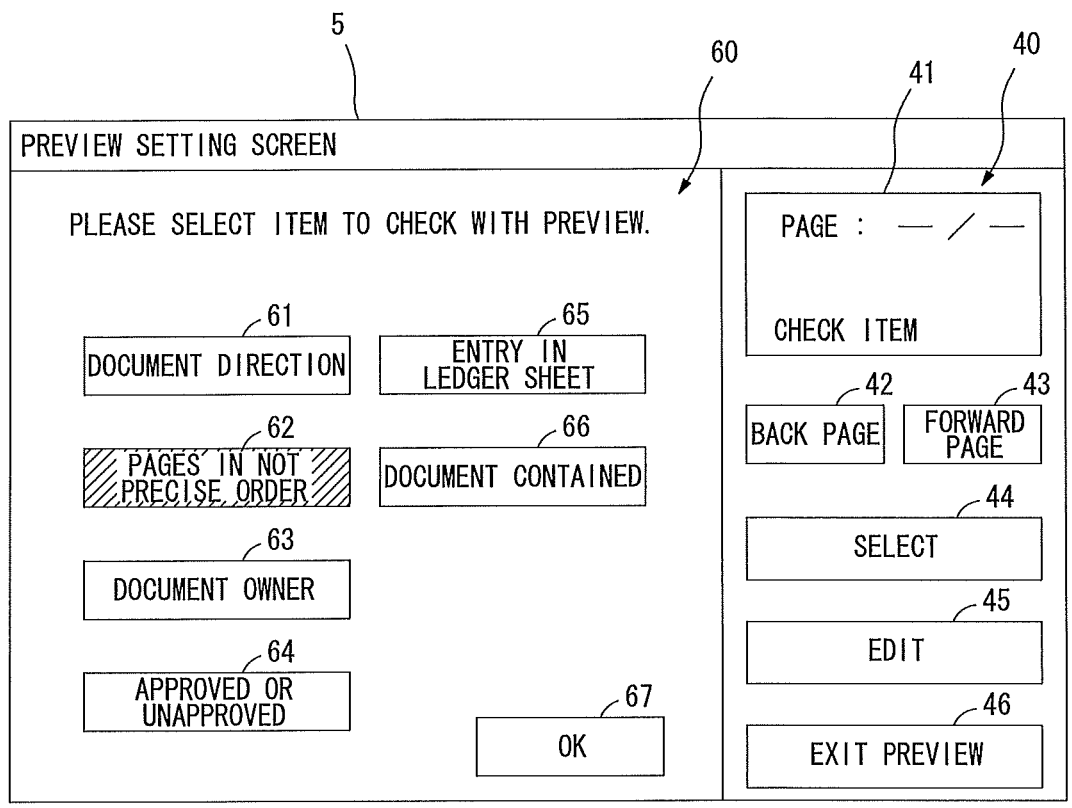
FIG. 12 is an example of a preview setting screen displayed on the display unit in the second preferred embodiment.

When detecting that the start key was operated by user's operation, the control computer 10 displays a preview setting screen on the display unit 5 of the operational panel 4 (step S400). FIG. 12 is an example of the preview setting screen displayed on the display unit 5. As illustrated in FIG. 12, the preview setting screen includes a preview check item display field 60 for specifying preview check item displayed at leftmost to the central part of the screen, and the operation screen 40 displayed in the right side. The operation screen 40 is, however, a screen which allows a user to operate a preview image after preview display is started. So, at this point of time, the user cannot make particular operation to the screen.

In the preview check item display field 60, an item that the user would like to check with preview is to be selected. A plurality of operation keys 61 to 66 selectable for the user is displayed therein. An ok key 67 is for fixing the item selected by the user. The operation key 61 is operated by user's selection when the user desires to check whether all pages of a document are inserted in the same direction. The operation key 62 is operated by user's selection when the user desires to check whether a document is the one with pages in not a precise order. In the example of FIG. 12, this operation key 62 is selected. The operation key 63 is operated by user's selection when the user desires to check owner of each page included in a document. The operation key 64 is operated by user's selection when the user desires to check whether or not each page included in a document is approved by a manager and others. The operation key 65 is operated by user's selection when the user desires to check whether or not numerical value and the like is entered in ledger sheet included in a document. The operation key 66 is operated by user's selection when the user desires to check whether or not any unnecessary page and others is contained in a document. Thus, in the preview check item display field 60, the plurality of operation keys 61 to 66 are displayed for the user to select an item that the user would like to check. In the preview check item display field 60, the plurality of operation keys may be selected by the user to specify a plurality of selected items at once.

The control computer 10 determines whether or not a check item is specified by the user with the preview setting screen of FIG. 12 being displayed on the display unit 5 (step S401). When the check item is specified (when a result of step S401 is YES), the control computer 10 displays a recommended preview range screen on the display unit 5 next (step S402).

Figure 13:
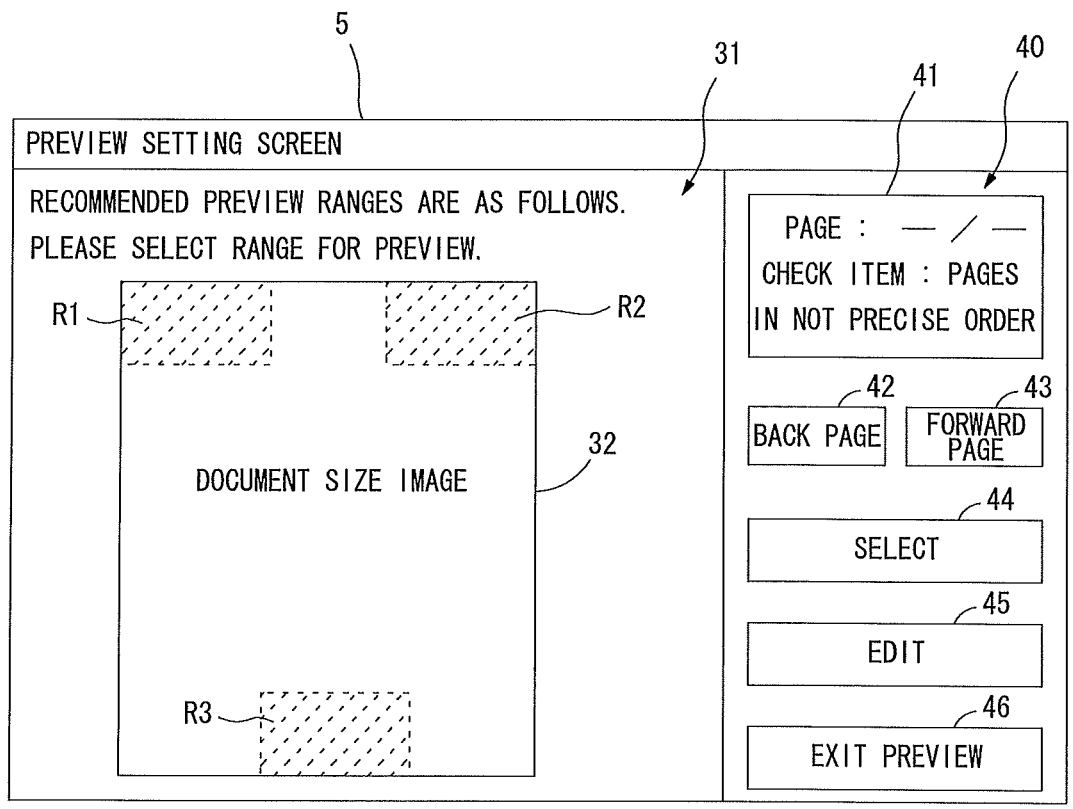
FIG. 13 is an example of a recommended preview range screen displayed on the display unit of the second preferred embodiment.

FIG. 13 is an example of the recommended preview range screen displayed on the display unit 5 here. The recommended preview range screen of FIG. 13 is a screen when the operation key 62 for the check item "pages in not a precise order" is selected on the screen of FIG. 12. For checking if a document is the one with pages in not a precise order, page number and the like stated in each page of the document is preferably checked easily. However, a part which includes page number and the like is different between each page of the document. So, the control computer 10 displays at least one part likely to include page number and the like as the recommended preview range. In case of FIG. 13, the document size image 32 of one page of the document is displayed as a sample based on document size specified by a user in advance or document size automatically detected by the ADF 2b. Three parts respectively be at the top left, at the top right, and in the lower center of the document size image 32 are displayed as recommended preview ranges R1, R2, and R3.

These recommended preview ranges R1, R2, and R3 are displayed corresponding to the check item selected by the user. So, for example, when checking of direction of each page of a document is specified by the user, parts including header, footer, and others are displayed as the recommended preview ranges. In this case, the recommended preview ranges R1, R2, and R3 the same as those of FIG. 13 may be displayed. When checking of owner of each page is specified by the user, a header part and others in which such as author of the document is stated are displayed as the recommended preview ranges. When checking of whether or not the document has approval of a manager and the like is specified by the user, parts likely to include signature of the approver, for example, are displayed as the recommended preview ranges. When checking of whether or not the numerical value and the like is entered in ledger sheet is specified, a central part of a page corresponding to a part in which the ledger sheet and others is displayed, for example, is displayed as the recommended preview range. Moreover, the operation key 66 is operated by user's operation to specify checking of whether or not unnecessary page is contained in a document. Also in such a case, page number and the like should be checked, for example, so the recommended preview ranges R1, R2, and R3 the same as those of FIG. 13 are displayed. If the plurality of check items are specified by the user, the recommended preview ranges respectively corresponding to each of the selected plurality of items are displayed.

As described above, when the recommended preview range screen is displayed on the display unit 5, operation to select one range for preview from at least one recommended preview ranges R1, R2, and R3 is made by the user. In the second preferred embodiment, instead of two points of the range for preview to be specified for the document size image 32, any one of at least one recommended preview ranges R1, R2, and R3 is selected, and the preview range may be specified.

Returning to the flow diagram shown in FIG. 10, the control computer 10 determines whether or not the recommended preview range is selected by the user (step S403). If any of the recommended preview ranges is selected (when a result of step S403 is YES), the displaying area determination part 13 determines the displaying area R based on the specified preview range (step S404). So, in case of FIG. 13, the recommended preview range selected by the user from three recommended preview ranges R1, R2, and R3 is determined as the displaying area R as it is for preview display.

In response to the determination of the displaying area R by the displaying area determination part 13, the process moves on to a processing explained in the flow diagram of FIG. 11. Each processing in step S405 to step S414 shown in FIG. 11 is the same as each one in step S203 to step S212 shown in FIG. 4. Detail of the edit processing in step S412 is also the same as processing explained in the flow diagram of FIG. 9.

In the second preferred embodiment, for instance, when the image reading section 2 starts reading of a document, and makes preview display based on the preview image 22 on the display unit 5, an image responsive to the displaying area R is extracted from the preview image 22, and the extracted image is displayed as well as in the first preferred embodiment. Also for update of preview page, an image responsive to the displaying area R is extracted from the preview image 22, and the extracted image is displayed on the display unit 5. At this time, the display control part 14 is only required to extract an image part responsive to the predetermined displaying area R, so the display control part 14 is not necessary to recognize the part including page number and the like automatically, resulting in reduced time taken to preview display of the preview image on the display unit 5. Therefore efficient preview display can be realized. Furthermore, the user is not necessary to perform any extra operation for enlarging or selecting the image for preview for each page, so a load for a user's operation is reduced.

Third Preferred Embodiment

A third preferred embodiment of the present invention is described next. In the third preferred embodiment, still another example of user's operation to specify which part of a whole image of a document to be displayed is explained. The configurations of the image processing device 1 and others of the third preferred embodiment are the same as those of the first and second preferred embodiments. The procedure of a process of reading of a document by the image reading section 2 of the third preferred embodiment is the same as the one shown in FIG. 3.

Figure 14:
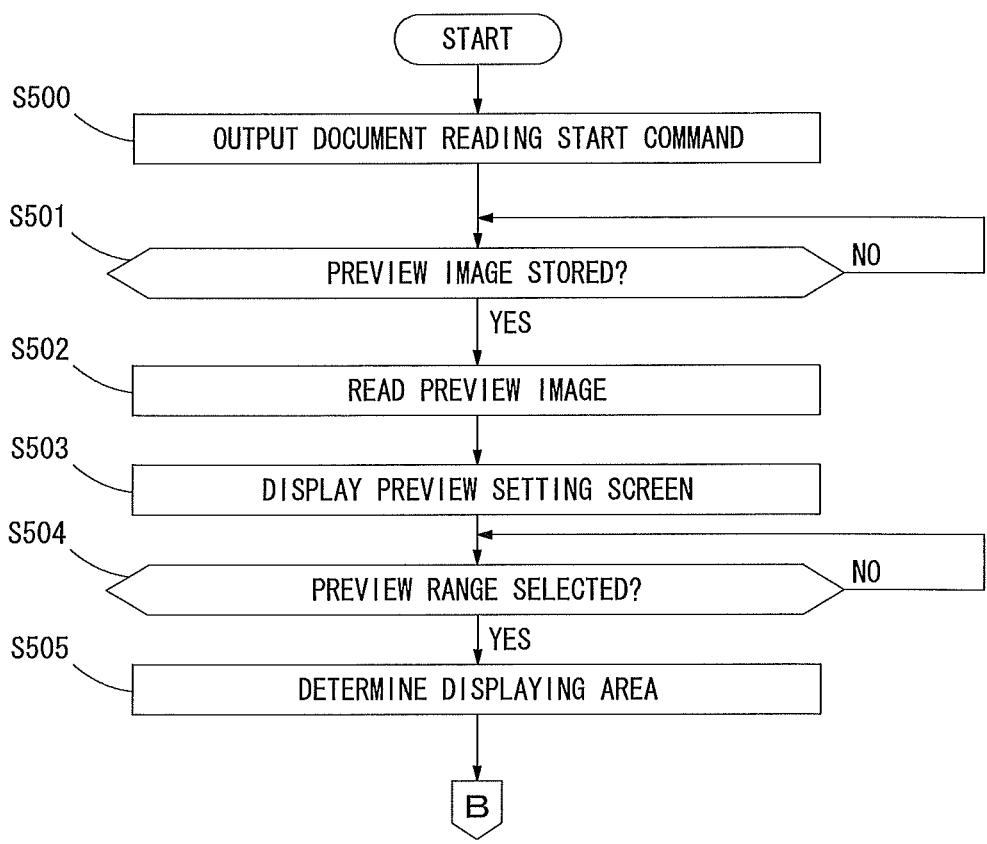
FIG. 14 and FIG. 15 are flow diagrams explaining an exemplary procedure of a processing when making preview display on the display unit in parallel with execution of reading of a document by the image reading section in the image processing device of the third preferred embodiment.
Figure 15:
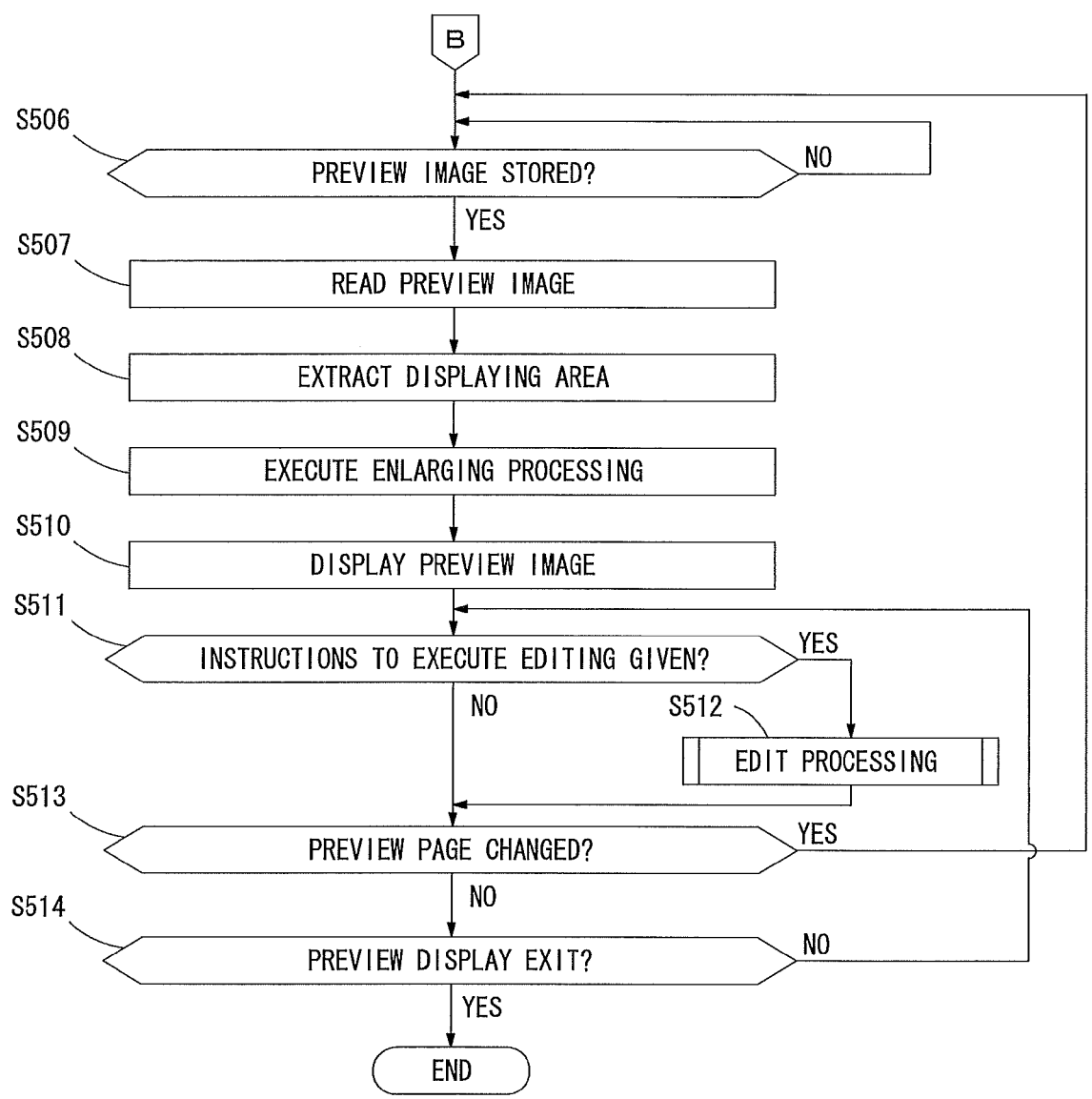

FIG. 14 and FIG. 15 are flow diagrams explaining an exemplary procedure of a processing when making preview display on the display unit 5 in parallel with reading operation of a document by the image reading section 2 in the image processing device 1 of the third preferred embodiment. This processing is executed mainly by putting the displaying area determination part 13, the display control part 14, and the image edit part 15 into operation to function in the control computer 10. The processing starts with the start key of the operational panel 4 being operated in response to user's operation, for example. In addition, this processing can be executed in parallel with the execution of the image reading processing illustrated in FIG. 3 in the image processing device 1.

When detecting that the start key was operated in response to user's operation, the control computer 10 outputs the document reading start command (step S500). Then, a result of the determination in step S100 in the above-described flow diagram of the FIG. 3 is YES, so sequential reading of the document is executed until reading of images of all pages of the document fed one by one by the ADF 2b completes. Each time the reading of one page of the document is executed, the image data 21 and the preview image 22 are respectively stored into the storage device 20. From here, the processing based on the flow diagrams shown in FIG. 14 and FIG. 15 is executed in parallel with the one based on the flow diagram shown in FIG. 3.

After outputting the document reading start command in step S500, the control computer 10 puts the display control part 14 into operation to function, and determines whether or not the preview image 22 for preview display is stored in the storage device 20 (step S501). If the preview image 22 to be displayed is not stored in the storage device 20, the display control part 14 is in a waiting state until the preview image 22 is stored. In response to the storage of the preview image 22 of the first page into the storage device 2, the display control part 14 reads the stored preview image 22 (step S502), and displays a preview setting screen on the display unit 5 of the operational panel 4 (step S503).

Figure 16:
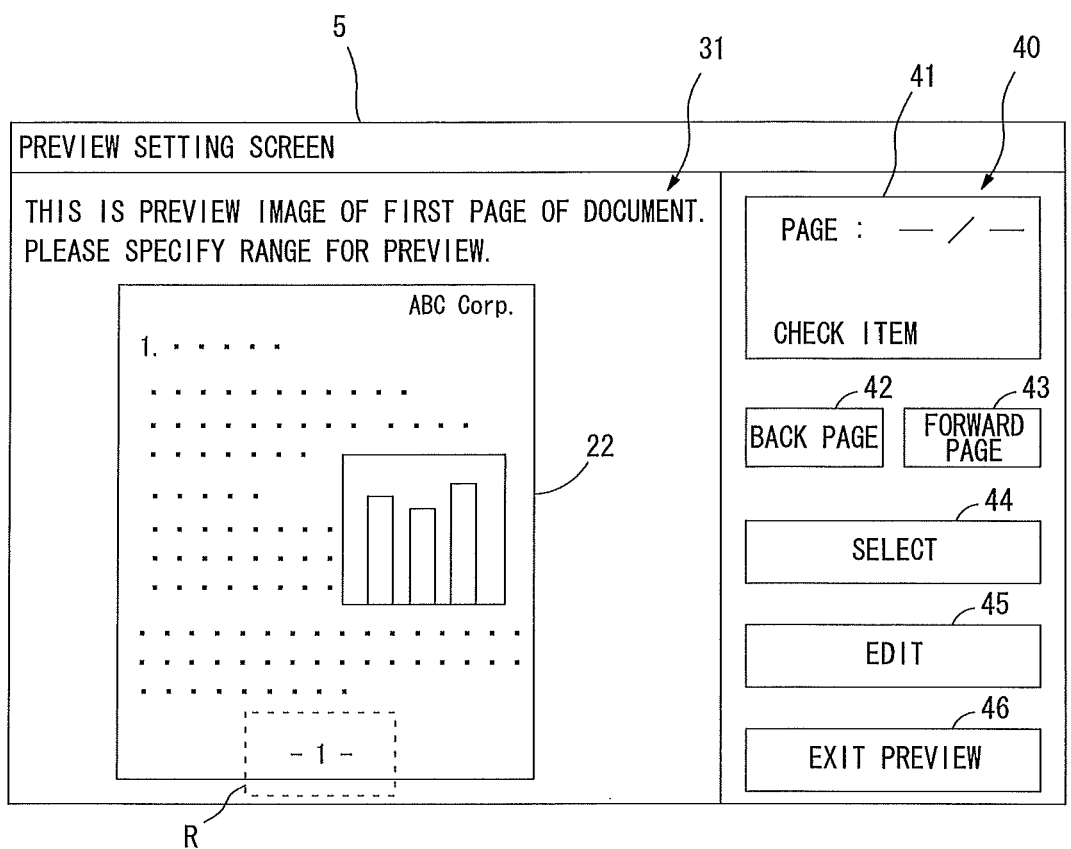
FIG. 16 is an example of the preview setting screen displayed on the display unit of the third preferred embodiment.

FIG. 16 is an example of the preview setting screen displayed on the display unit 5. As shown in FIG. 16, a whole image of the preview image 22 of the first page of the document is displayed in reduced-size in the preview range specifying field 31 on the preview setting screen. Therefore, the user may figure out a part in which page number and others is stated easily with viewing the whole image of the preview image 22 displayed on the display unit 5, and may specify a preview range easily as an advantage. The preview range that is desired by the user to be displayed with extra attention for subsequent preview is specified to the preview image 22. As explained in the first preferred embodiment, for instance, arbitrary two points are specified for the preview image 22, and a preview range that has the specified two points as diagonally opposite two vertices is specified. In the example of FIG. 16, a shaded rectangle part is the preview range thereby specified by the user.

The control computer 10 determines whether or not the preview range is specified by user's operation with the preview setting screen of FIG. 16 being displayed (step S504). When the preview range is specified (when a result of step S504 is YES), the displaying area determination part 13 determines the displaying area R based on the specified preview range. That is, in case of FIG. 16, the preview range of the shaded rectangle part specified by the user is determined as it is as the displaying area R for preview display.

In response to the determination of the displaying area R, the process moves onto the flow diagram illustrated in FIG. 15. The display control part 14 of the control computer 10 comes into operation to function to execute processing in step S506 to step S514. The processing in S506 to step S514 shown in FIG. 15 is respectively the same as the one in step S204 to step S212 shown in FIG. 4. In addition, detail of the edit processing in step S512 is the same as the one explained in the flow diagram of FIG. 9.

According to the third preferred embodiment, the preview image 22 of the first page has already been stored in the storage device 20 at the determination of the displaying area R. So, a result of step S506 is YES, and an image responsive to the displaying area R is instantly extracted from the preview image 22 of the first page. The extracted image is displayed on the display unit 5. After then, for update of preview page, an image responsive to the displaying area R is extracted, and the extracted image is displayed on the display unit 5. When the edit key 45 is operated in response to user's operation, edit processing (step S512) is executed appropriately.

Like in the first and second preferred embodiments as described above, in the third preferred embodiment, for making preview display of an image read from a document, image made preview display is limited to a part that the user would like to check, and the limited part is displayed on the display unit 5, so a load for user's operation can by reduced. Also, time taken before preview display on the display unit 5 can be reduced.

Furthermore, especially in the third preferred embodiment, a whole image of the preview image 22 is displayed on the display unit 5 when the first page of a document is read. The user may make operation for specifying a part that he or she would like to make enlarged display particularly with viewing at the whole image of the preview image 22. Therefore, the user does not have to check which part of the document in that page number and others is stated in advance before setting the document on the ADF 2b, resulting in further improvement of user's operation.

Fourth Preferred Embodiment

A fourth preferred embodiment of the present invention is described next. For user's operation to specify which part of a whole image of a document to be displayed, an example of displaying the preview setting screen after the first page of a document is read is explained in the above-described third preferred embodiment. In the fourth preferred embodiment, for user's operation to specify which part of a whole image of a document to be displayed, an example of displaying the preview setting screen when pages for predetermined number are read. The configurations of the image processing device 1 and others of the third preferred embodiment are the same as those illustrated in FIG. 1 and FIG. 2. The procedure of a process of reading of a document by the image reading section 2 of the fourth preferred embodiment is the same as the one shown in FIG. 3.

Figure 17:
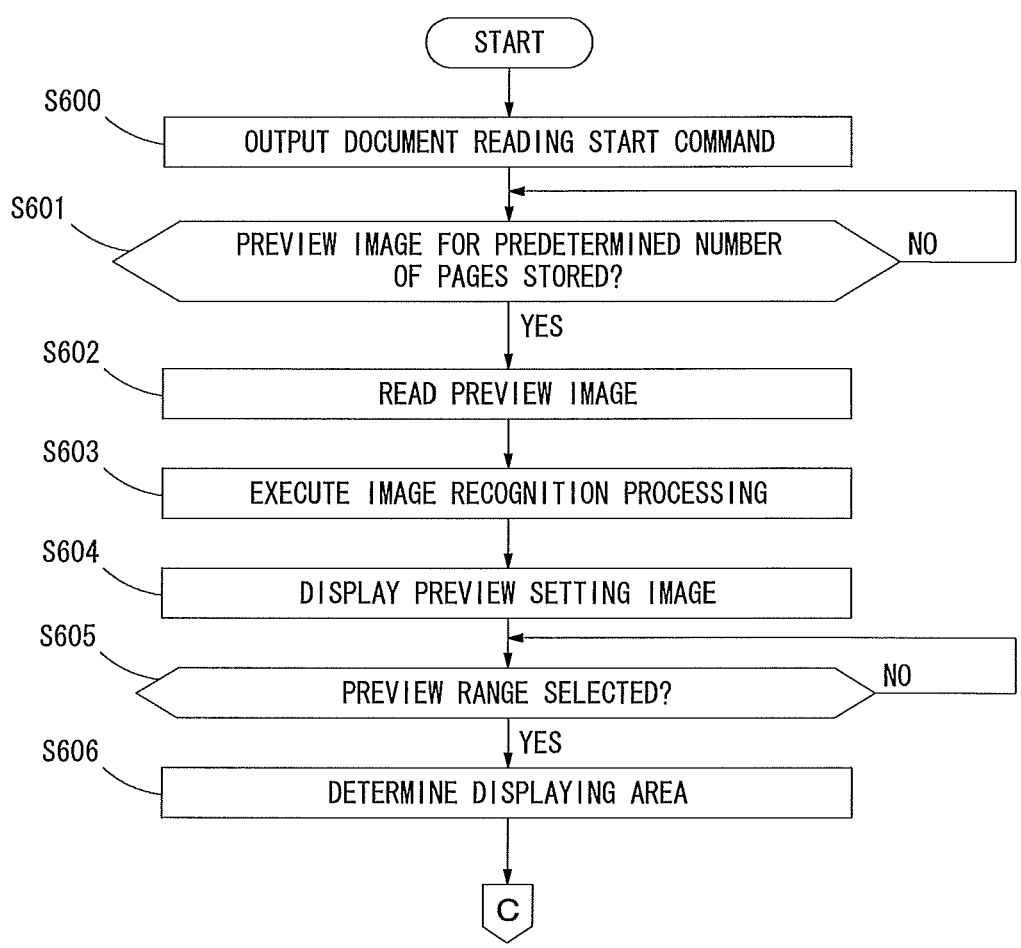
FIG. 17 and FIG. 18 are flow diagrams explaining an exemplary procedure of a processing when making preview display on the display unit in parallel with execution of reading of a document by the image reading section in the image processing device of the fourth preferred embodiment.
Figure 18:
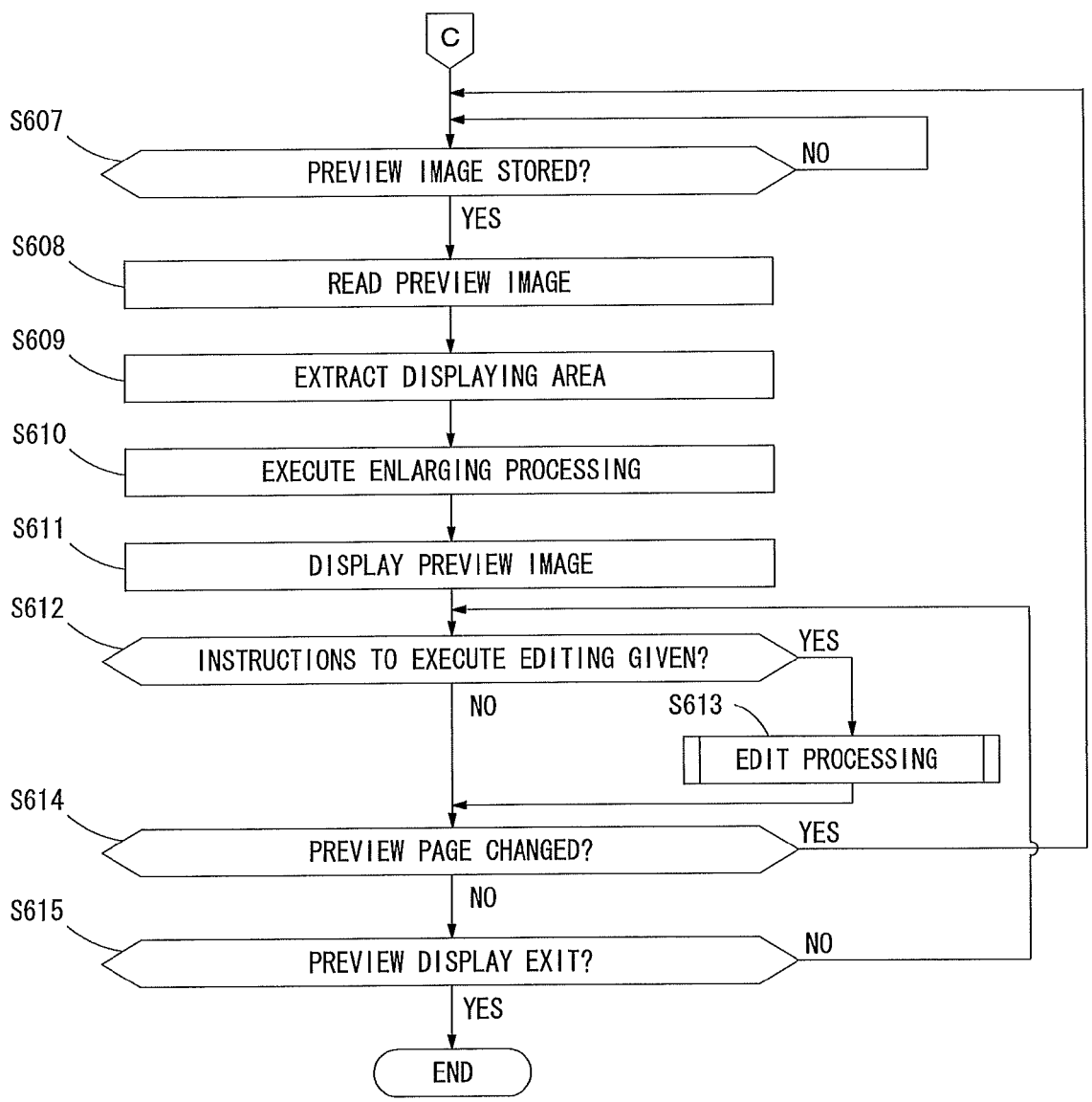

FIG. 17 and FIG. 18 are flow diagrams explaining an exemplary procedure of a processing when making preview display on the display unit 5 in parallel with execution of reading of a document by the image reading section 2 in the image processing device 1 of the fourth preferred embodiment. The processing is executed in the control computer 10 mainly by putting the displaying area determination part 13, the display control part 14, and the image edit part 15 into operation to function. The processing starts with the start key of the operational panel 4 being operated in response to user's operation, for instance. In addition, this processing may be executed in parallel with the image reading processing illustrated in FIG. 3 in the image processing device 1.

As detecting the start key was operated in response to user's operation, the control computer 10 outputs the document reading start command to the image reading section 2 (step S600). Thus, a result of the determination in step S100 in the above-described flow diagram of FIG. 3 is YES, and sequence reading of pages of a document is executed until images of all pages of the document fed one by one by the ADF 2b are read. Every time the reading of one page of the document is executed, the image data 21 and the preview image 22 are respectively stored into the storage device 20. From here, the processing based on the flow diagrams shown in FIG. 17 and FIG. 18 is executed in parallel with the one based on the flow diagram shown in FIG. 3

After outputting the document reading start command in step S600, the control computer 10 is in a waiting state until the preview image 22 for predetermined number pages are stored into the storage device 20 (step S601). In the example of the forth preferred embodiment, the predetermined number is 3, for example. As the preview images 22 for 3 pages are stored into the storage device 20, the displaying area determination part 13 of the control computer 10 comes into operation to function. The displaying area determination part 13 reads the stored preview images 22 for 3 pages (step S602), and executes image recognition processing of the preview images 22 for 3 pages (step S603). In this image recognition processing, by making comparison among the preview images 22 for 3 pages, for example, at least one similar image part of full page is extracted.

Figure 19:
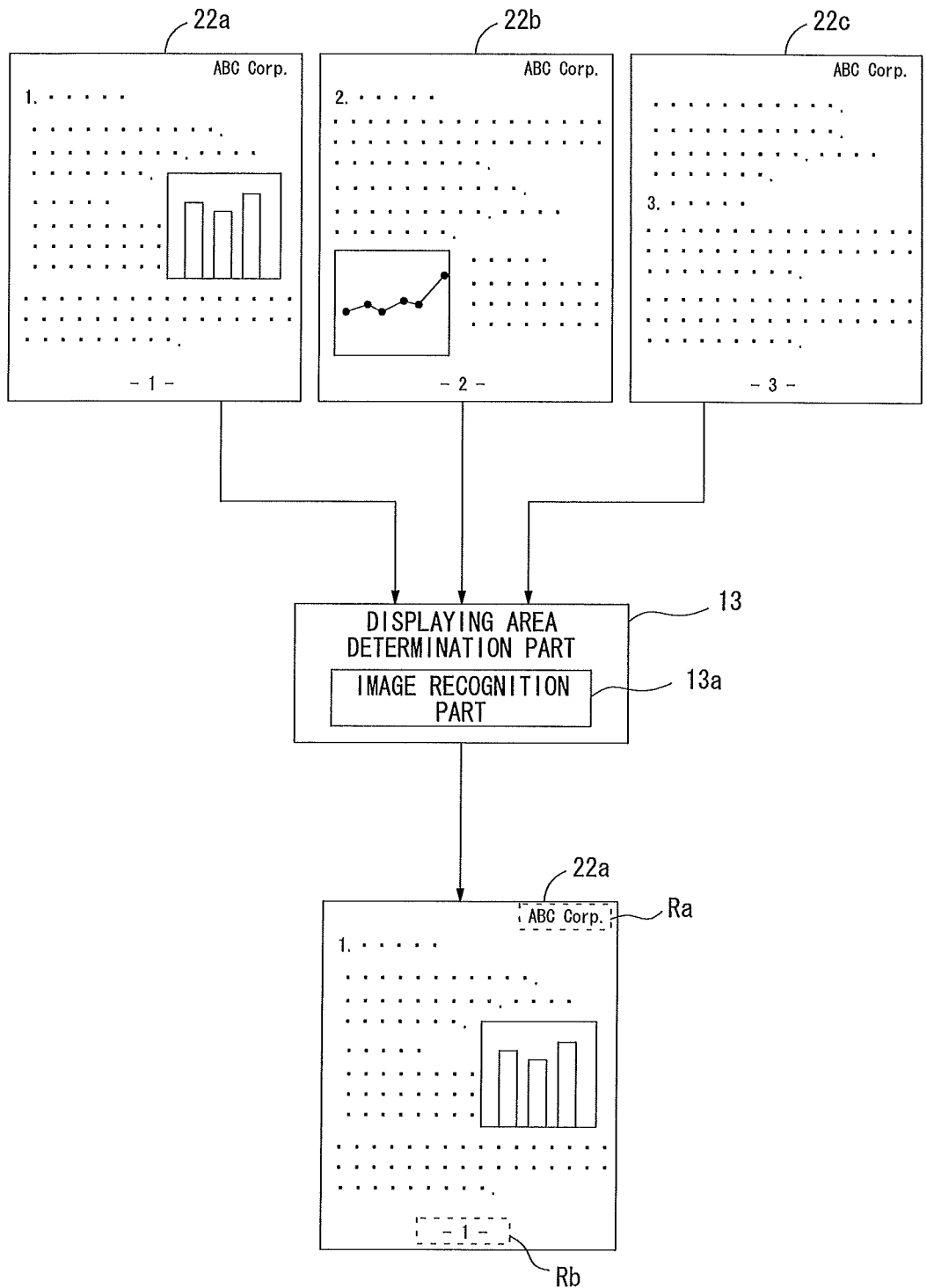
FIG. 19 is an example of an image recognition processing executed by the displaying area determination part of the third preferred embodiment.

FIG. 19 is an example of the image recognition processing executed by the displaying area determination part 13. By way of example, the preview image 22 of the first to third page is respectively a preview image 22a, 22b, and 22c shown in FIG. 19. In that case, the displaying area determination part 13 reads each of the preview images 22a, 22b, and 22c when three preview images 22a, 22b, and 22c are stored into the storage device 20. The displaying area determination part 13 of the fourth preferred embodiment also functions as an image recognition part 13a which makes comparison among these three preview images 22a, 22b, and 22c, and extracts the similar image part. In the example of FIG. 19, two similar image parts Ra and Rb of the preview image 22a are extracted as parts which are similar to other preview images 22b and 22c.

Figure 20:
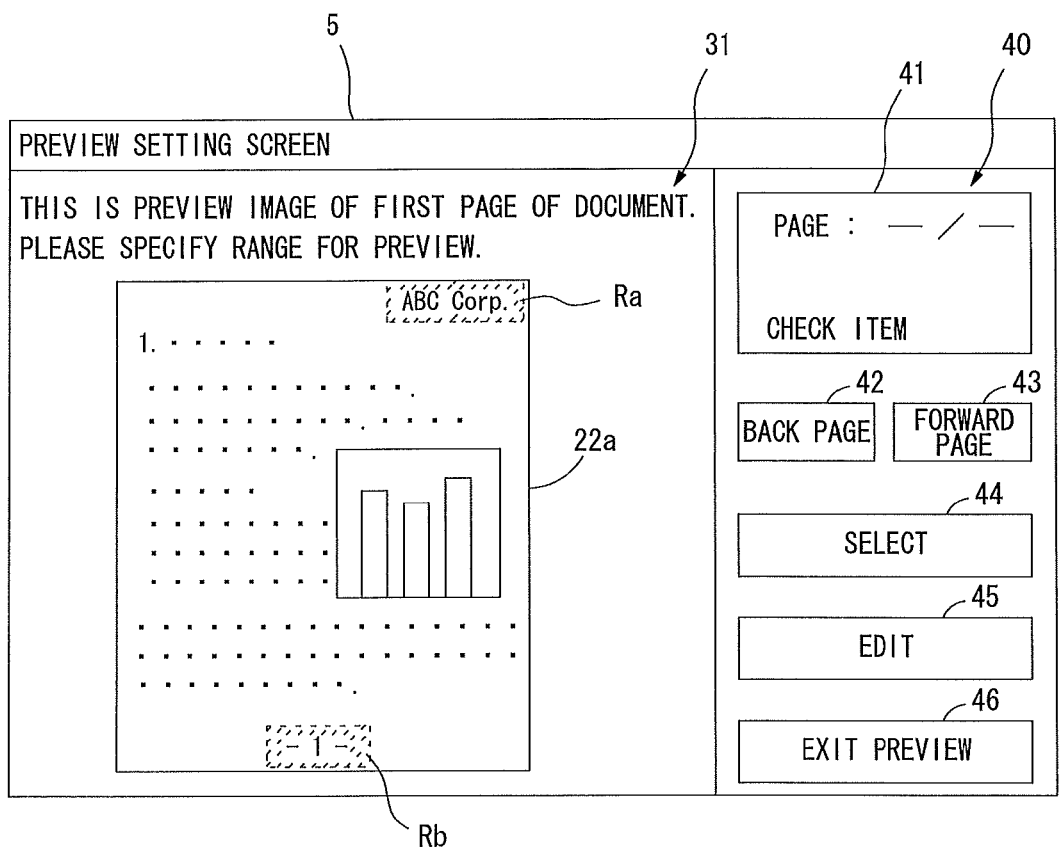
FIG. 20 is an example of the preview setting screen displayed on the display unit in the fourth preferred embodiment.

After at least one similar image part could be extracted by the image recognition part 13a, the displaying area determination part 13 displays a preview setting screen on the display unit 5 (step S604). FIG. 20 is an example of the preview setting screen displayed on the display unit 5. As shown in FIG. 20, in the preview range specifying field 31 on the preview setting screen, a whole image of the preview image 22a of the first page is displayed in reduced-size, and the similar image parts Ra and Rb extracted in response to the image recognition processing are superimposed and displayed on the preview image 22a. The similar image parts Ra and Rb displayed on the display unit 5 here are displayed as the recommended preview ranges explained in the second preferred embodiment. Therefore, the user selects one range for preview from at least one similar image parts Ra and Rb, thereby specifying the preview range.

The displaying area determination part 13 determines whether or not preview range is selected in response to user's operation (step S605). When preview range is selected (when a result of step S605 is YES), the displaying area determination part 13 determines the displaying area R based on the selected preview range (step S606). In case of FIG. 20, for example, a similar image part selected by the user from two similar image parts Ra and Rb is determined as it is as the displaying area R for preview display.

As the displaying area determination part 13 determines the displaying area R, the process moves on to the flow diagram shown in FIG. 18. The processing in step S607 to step S615 shown in FIG. 18 is respectively the same as the one in step S204 to step S212 shown in FIG. 4. In addition, detail of the edit processing in step S613 is the same as one explained in the flow diagram of FIG. 9.

According to the fourth preferred embodiment, each preview image 22 of the first to third page has already been stored in the storage device 20 when the displaying area R is determined. So, a result of step S607 is YES, and an image responsive to the displaying area R is instantly extracted from the preview image 22 of one page. The extracted image is then displayed on the display unit 5. After then, for every update of preview page, an image responsive to the displaying area R is extracted, and the extracted image is displayed on the display unit 5. When the edit key 45 is operated in response to user's operation, edit processing (step S613) is executed appropriately.

Like in the first and second preferred embodiments as described above, in the fourth preferred embodiment, for making preview display of an image read from a document, image made preview display is limited to a part that the user would like to check, and the limited part is displayed on the display unit 5, so load for user's operation can by reduced. In the fourth preferred embodiment, however, the image recognition processing is executed at the point that pages of predetermined number are read, so a part that the user would like to check with preview may not be displayed until the completion of the image recognition processing. The image recognition processing of the fourth preferred embodiment is not executed for each update of preview page, so update of the preview page may be executed in reduced time.

Especially in the fourth preferred embodiment, image recognition is executed at the point that pages of predetermined number are read, and at least one similar image part in all of a plurality of preview images 22 is superimposed and displayed on the preview images 22. So, the user may specify a part that he or she would like to make display particularly with preview easily.

Modifications

While the preferred embodiments of the present invention have been described above, the present invention is not intended to be confined to the details shown above.

In the above-described preferred embodiments, the image processing device 1 to which the present invention is intended is a device called as complex devices or MFPs (multifunction peripherals). However, the image processing device 1 is not necessarily a device having several functions. The image processing device 1 may be a scanner-only device. Moreover, the image processing device 1 may be a copier-only device or a FAX-only device.

In the fourth preferred embodiment, at least one similar image parts Ra and Rb extracted in response to the image recognition processing is displayed as it is as the recommended preview range. However, this may be combined with substance explained in the second preferred embodiment. According to the above-described second preferred embodiment, user's operation to specify check item is received before the execution of the reading of a document is started. The image recognition processing is then executed to extract a plurality of similar image parts at the point that pages of predetermined number are read. Then, at least one of parts that are suitable for the check item (for example, "pages in not a precise order") specified by the user from the plurality of similar image parts to be checked with preview is specified. At least one similar image part thereby specified may be displayed as the recommended preview range. In such a case, user's operability for specifying preview range is further improved.

In the above-described first to fourth preferred embodiments, the displaying area R is specified in response to user's operation once before and after the execution of the sequential reading of a plurality of pages included in a document is started. However, this is not the only example regarding the number of user's operation to specify the displaying area R. As another example, after preview display is made based on the displaying area R specified by the user, the user may notice that he or she has made an operation to specify the wrong the displaying area R by mistake. So, even after preview display is made based on the displaying area R, the image processing device 1 may receive user's operation to change specification of the displaying area R. After user's operation to change specification of the displaying area R is made, preview display is preferably made according to the change of the displaying area R.

While the invention has been shown and described in detail, the foregoing description is in all aspects illustrative and not restrictive. It is therefore understood that numerous modifications and variations can be devised without departing from the scope of the invention.

What is claimed is:

1. An image processing device, comprising:
   an image reader for reading an image of a document and generating image data;
   a display; and
   a processor, wherein
   said processor creates a preview image of a page of the document based on the image data generated by said image reader,
   said processor receives an operation to select at least one of multiple items set in advance by a user to check said preview image based on an input made by the user before generation of the image data by said image reader,
   a predetermined area in said preview image is associated with each of said at least one of multiple items,
   said processor determines the predetermined area associated with a selected item as a displaying area when at least one of said multiple items is selected based on the input made by the user, and
   said processor extracts an image responsive to said determined displaying area in said preview image, and displays the extracted image on said display.

2. The image processing device according to claim 1, wherein
   said processor displays multiple predetermined areas on said display, and determines said multiple predetermined areas as said displaying area when said multiple predetermined areas are associated with said selected item.

3. The image processing device according to claim 1, further comprising:
   a memory for storing therein said created preview image, wherein
   said image reader is operable to perform continuous automatic reading of the document with multiple pages,
   said processor creates said preview image for each of the multiple pages one after another based on the image data of each page generated during the continuous automatic reading by said image reader, and stores each created preview image in said memory, and said processor extracts the image responsive to said displaying area one after another in said preview image read from said memory and displays the extracted image on said display.

4. The image processing device according to claim 1, wherein
said processor executes edit processing of the image data responsive to said preview image when edit instructions are given based on the input made by the user as said preview image is being displayed on said display.

5. The image processing device according to claim 4, wherein
said edit processing includes at least one processing of rotation of the image data, deletion, addition of page number, and shift of pages.

6. An image processing method performed by a processor of an image processing device which includes an image reader for reading an image of a document and generating image data, a display and said processor, comprising the steps of:
(a) creating a preview image of a page of the document based on the image data generated by said image reader;
(b) receiving an operation to select at least one of multiple items set in advance by a user to check said preview image based on an input made by the user before generation of the image data by said image reader, wherein a predetermined area in said preview image is associated with each of said at least one of multiple items;
(c) determining the predetermined area associated with a selected item as a displaying area when the operation to select at least one of said multiple items is received in said step (b); and
(d) extracting an image responsive to said determined displaying area in said preview image, and displaying the extracted image on said display.

7. The image processing method according to claim 6, wherein
in said step (c), multiple predetermined areas are displayed on said display, and said multiple predetermined areas are determined as said displaying area when said multiple predetermined areas are associated with said selected item in said step (b).

8. The image processing method according to claim 6, wherein
said image processing device further includes a memory for storing therein said created preview image,
said image reader is operable to perform continuous automatic reading of the document with multiple pages,
in said step (a), said preview image is created for each of the multiple pages one after another based on the image data of each page generated during the continuous automatic reading by said image reader, and each created preview image is stored in said memory, and
in said step (d), the image responsive to said displaying area is extracted one after another in said preview image read from said memory and the extracted image is displayed on said display.

9. The image processing method according to claim 6, further comprising the step of:
(e) executing edit processing of the image data responsive to said preview image when edit instructions are given based on the input made by the user as said preview image is being displayed on said display.

10. The image processing method according to claim 9, wherein
said edit processing includes at least one processing of rotation of the image data, deletion, addition of page number, and shift of pages.

11. A non-transitory computer readable recording medium on which a computer program is recorded, said computer program being executable by a processor of an image processing device which includes an image reader for reading an image of a document and generating image data, a display and said processor, said computer program causing said processor to execute the steps of:
(a) creating a preview image of a page of the document based on the image data generated by said image reader;
(b) receiving an operation to select at least one of multiple items set in advance by a user to check said preview image based on an input made by the user before generation of the image data by said image reader, wherein a predetermined area in said preview image is associated with each of said at least one of multiple items;
(c) determining the predetermined area associated with a selected item as a displaying area when the operation to select at least one of said multiple items in said step (b); and
(d) extracting an image responsive to said determined displaying area in said preview image, and displaying the extracted image on said display.

12. The non-transitory computer readable recording medium according to claim 11, wherein
in said step (c), multiple predetermined areas are displayed on said display, and said multiple predetermined areas are determined as said displaying area when said multiple predetermined areas are associated with said selected item in said step (b).

13. The non-transitory computer readable recording medium according to claim 11, wherein
said image processing device further includes a memory for storing therein said created preview image,
said image reader is operable to perform continuous automatic reading of the document with multiple pages,
in said step (a), said preview image is created for each of the multiple pages one after another based on the image data of each page generated during the continuous automatic reading by said image reader, and each created preview image is stored in said memory, and
in said step (d), the image responsive to said displaying area is extracted one after another in said preview image read from said memory and the extracted image is displayed on said display.

14. The non-transitory computer readable recording medium according to claim 11, said program causing said processor to further execute the step of:
(e) executing edit processing of the image data responsive to said preview image when edit instructions are given based on the input made by the user as said preview image is being displayed on said display.

15. The non-transitory computer readable recording medium according to claim 14, wherein
said edit processing includes at least one processing of rotation of the image data, deletion, addition of page number, and shift of pages.

* * * * *